United States Patent [19]

Bergh

[11] Patent Number: 5,120,130
[45] Date of Patent: Jun. 9, 1992

[54] APPARATUS AND METHOD FOR REDUCING PHASE ERRORS IN AN INTERFEROMETER

[75] Inventor: Ralph A. Bergh, Palo Alto, Calif.

[73] Assignee: The Board of Trustees of the Leland Stanford Junior University, Stanford, Calif.

[21] Appl. No.: 413,371

[22] Filed: Sep. 27, 1989

Related U.S. Application Data

[63] Continuation of Ser. No. 488,732, Apr. 26, 1983, abandoned.

[51] Int. Cl.$^5$ ............................................. G01C 19/72
[52] U.S. Cl. ............................................................ 356/350
[58] Field of Search ............................................. 356/350

[56] References Cited

U.S. PATENT DOCUMENTS

| | | | |
|---|---|---|---|
| 4,354,760 | 10/1982 | Schiffner | 356/350 |
| 4,410,275 | 10/1983 | Shaw et al. | 356/350 |
| 4,456,377 | 6/1984 | Shaw et al. | 356/350 |
| 4,529,312 | 7/1985 | Pavlath et al. | 356/350 |
| 4,529,313 | 7/1985 | Petermann et al. | 356/350 |
| 4,634,282 | 1/1987 | Shaw et al. | 356/350 |
| 4,881,817 | 11/1989 | Kim et al. | 356/350 |

FOREIGN PATENT DOCUMENTS

| | | | |
|---|---|---|---|
| 3006580 | 8/1981 | Fed. Rep. of Germany | 356/350 |
| WO8300552 | 2/1983 | PCT Int'l Appl. | 356/350 |

OTHER PUBLICATIONS

G. Pavlath and H. J. Shaw, "Birefringence and Polarization Effects in Fiber Gyroscopes", Applied Optics, vol. 21, No. 10 (May 15, 1982).
G. Pavlath and H. J. Shaw, "Multimode Fiber Gyroscopes", Fiber Optic Sensors and Related Technologies (Conference Proceedings, MIT, Nov. 9-11, 1981), vol. 32 (1982).
R. J. Fredricks, "Scattering Matrix Analysis on the Use of Wide-Band Laser Source in a Passive Fiber Rate Sensor", Fiber Optic Rotation Sensors and Related Technologies, Conference Proceedings, MIT, Nov. 9-11, 1981, pp. 82-92 (1982).
Lin, et al., "Sensitivity Analysis of the Sagnac-Effect Optical-Fiber Ring Interferometer", Applied Optics, vol. 18, No. 6, Mar. 15, 1979, pp. 915-931.
Bohn, et al. "Low Drift Fiber gyro Using a Superluminescent Diode", Electronic Letters, vol. 17, No. 10, (1981).
Wang, et al., "High-power Low-divergence Superradiance Diode", Applied Physics Letters, vol. 41, No. 7, Oct. 1, 1982.
Birch et al. "Fabrication of Polarisation-Maintaining Fibres Using Gas-Phase Etching", Electronic Letters, vol. 18, No. 24, Nov. 25, 1982.
W. K. Burns, et al., "Fiber-Optic Gyroscopes with Broad-Band Sources", Journal of Lightwave Technology, vol. LT-1, No. 1, Mar. 1983.

Primary Examiner—Samuel Turner
Attorney, Agent, or Firm—Knobbe, Martens, Olson & Bear

[57] ABSTRACT

A fiber optic rotation sensor comprises a fiber optic interferometer loop formed from a highly birefringent optical fiber, and a short coherence length source for introducing light into the interferometer loop to provide a pair of waves which counter-propogate therethrough. A detector is included to detect the phase difference between the waves after they have traversed the loop to provide an indication of the loop rotation rate, in accordance with the Sagnac effect. Phase errors are reduced by selecting the coherence length of the source and the birefringence of the fiber, so that the loop is comprised of plural fiber coherence lengths. The term "fiber coherence length" should be distinguished from source coherence length. Fiber coherence length is the length of fiber required for the optical path length difference between the two polarization modes of a single mode fiber to equal one coherence length of the light source.

In addition, phase errors are reduced by providing a birefringent waveguide between the source and the loop such that light propagates from the source to the loop in an optical path having a path length difference which is at least equal to a coherence length of the source. Phase errors are further reduced by positioning the detector to intercept the optical output signal from the loop such that light wave components in orthogonal modes are spatially averaged.

15 Claims, 9 Drawing Sheets

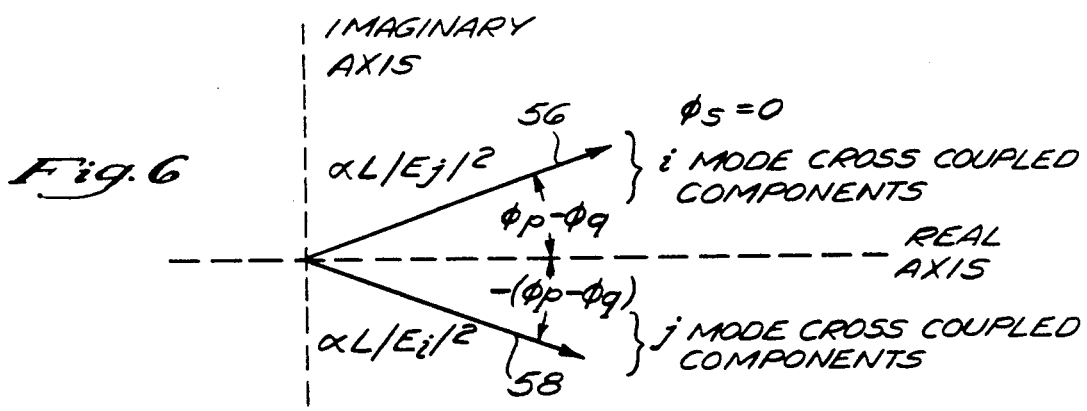
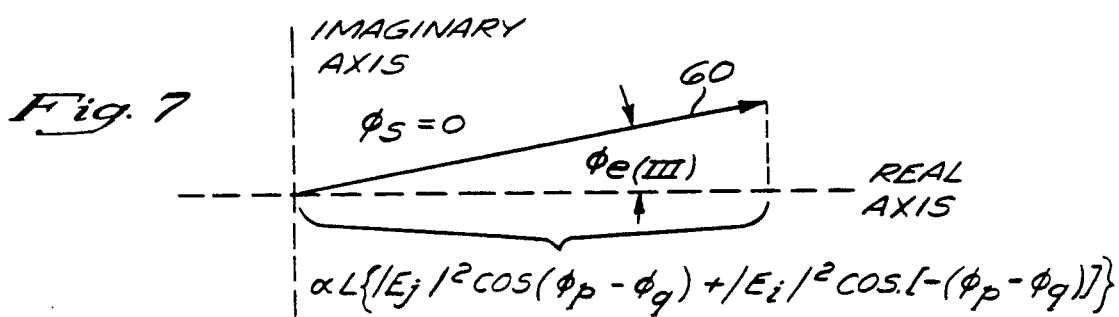
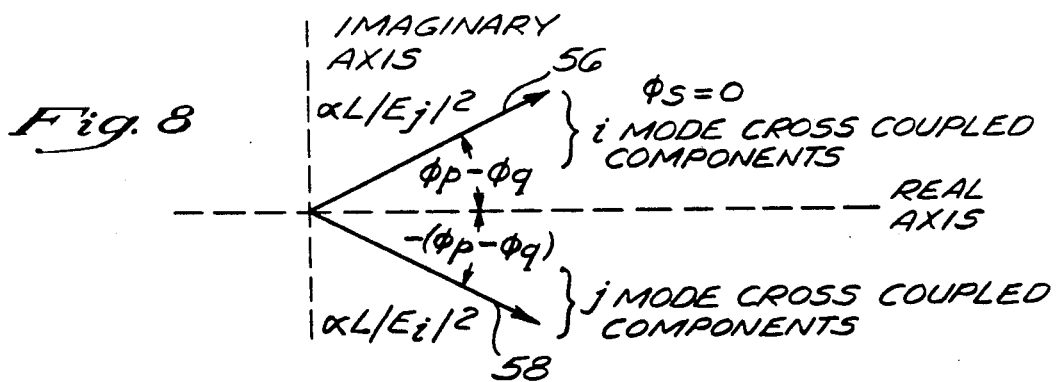
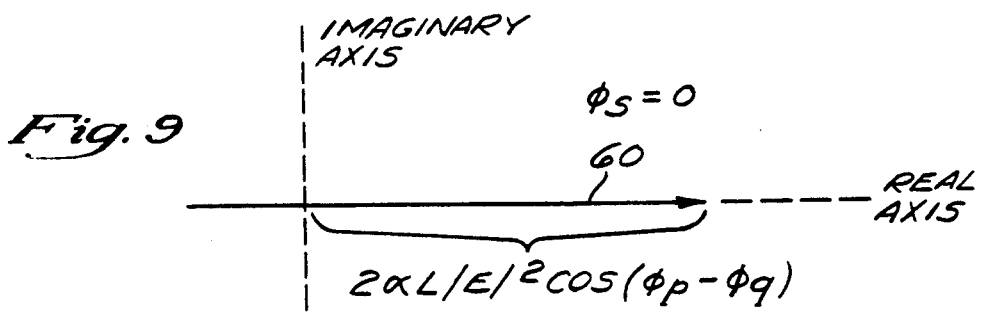

APPARATUS AND METHOD FOR REDUCING PHASE ERRORS IN AN INTERFEROMETER

This application is a continuation of application Ser. No. 488,732, filed Apr. 26, 1983, and now abandoned.

BACKGROUND OF THE INVENTION

The present invention relates to rotation sensors for use in, e.g., gyroscopes, and particularly to fiber optic rotation sensors.

Fiber optic rotation sensors typically comprise a loop of single-mode optical fiber to which a pair of lightwaves are coupled for propagation in opposite directions around a loop. If the loop is rotated, the counter-propagating waves will undergo a phase shift, due to the well-known Sagnac effect, yielding a phase difference between the waves after traverse of the loop. By detecting this phase difference, a direct indication of the rotation rate of the loop may be obtained.

If the optical path lengths about the loop for the counter-propagating waves are equal when the loop is at rest, the interferometer is said to be "reciprocal". In practice, however, fiber interferometer loops are ordinarily not reciprocal, due to the fact that present, commercially available optical fibers are not optically perfect, but are birefringent (i.e., doubly refractive), resulting in two orthogonal polarization modes, each of which propagates light at a different velocity. One of the polarization modes, therefore, provides a "fast channel", while the other provides a "slow channel." In addition, the fiber birefringence is sensitive to environmental factors, such as temperature, pressure, magnetic fields, etc., so that, at any given point along the fiber, the birefringence can vary over time in an unpredictable manner. Birefringence affects the counter-propagating waves in a complex way, however, the effect may be viewed as causing a portion of the waves to be coupled from one of the polarization modes to the other, i.e., from the "fast channel" to the "slow channel or vice versa. The result of such coupling between modes is that each of the counter-propagating waves may travel different optical paths around the loop, and thus, require different time periods to traverse the fiber loop, so that there is a phase difference between the waves when the loop is at rest, thereby making the interferometer non-reciprocal.

The foregoing may be more fully understood through a rather simplistic, extreme example in which it is assumed that there is birefringence only at one point in the fiber loop, and that this point is located near one end of the loop. It is also assumed that such birefringence is sufficient to cause light energy to be entirely coupled from one polarization mode to the other, and that there is no coupling between modes anywhere else in the fiber loop. If the counter-propagating waves are introduced into the loop in the fast channel, one of the waves will immediately be coupled to the slow channel while the other wave will traverse most of the loop before being coupled to the slow channel. Thus, one of the waves will traverse most of the loop in the fast channel, while the other will traverse most of the loop in the slow channel, yielding a phase difference between the waves when the loop is at rest. If this birefringence-induced phase difference were constant, there would, of course, be no problem, since the rotational induced Sagnac phase difference could be measured as a deviation from this constant birefringence-induced phase difference. Unfortunately, however, such birefringence-induced phase differences vary with time, in an unpredictable manner, and thus, these birefringence-induced phase differences are indistinguishable from rotationally-induced, Sagnac phase differences. Thus, time varying changes in birefringence are a major source of error in fiber optic rotation sensors.

The prior art has addressed the problem of nonreciprocal, birefringence-induced phase differences in a variety of ways. In one approach, described by R. A. Bergh, H. C. Lefevre, and H. J. Shaw in Optics Letters, Volume 6, No. 10 (October 1981), a fiber optical polarizer is utilized to block light in one of the two orthogonal polarization modes while passing light in the other. This insures that only a single optical path is utilized, thereby providing reciprocity. This approach is also described in International Patent Application No. PCT/US 82/00400 published Oct. 14, 1982, as Publication No. WO 82/03456, entitled "Fiber Optic Rotation Sensor," and also in corresponding U.S. patent application Ser. No. 307,095, filed Sept. 30, 1981, entitled "Fiber Optic Rotation Sensor", which is a continuation-in-part of patent application Ser. No. 249,714, filed Mar. 31, 1981. Another approach involves utilizing unpolarized light, which has been found to result in cancellation of birefringence-induced phase differences upon combining the counter-propagating waves after traverse of the loop. The degree of cancellation is proportional to the degree to which the light waves are unpolarized. This approach is described in detail in International Patent Application No. PCT/US 82/00985, published Feb. 17, 1983 as Publication No. 83/00552, and also in corresponding U.S. patent application, Ser. No. 288,212, filed Jul. 29, 1981, entitled "Fiber Optic Rotation Sensor Utilizing Unpolarized Light".

It is also known in the art to utilize polarization-conserving fibers to reduce coupling between the modes. Polarization-conserving fibers are essentially high birefringence fibers, in which the fiber is mechanically stressed during manufacture to increase the difference in the refractive indicies of the two polarization modes. This reduces coupling between the modes, since the high birefringence tends to preserve the polarization of the light waves. In effect, changes in birefringence due to environmental factors are overwhelmed by the stress-induced birefringence created during manufacture of the fiber.

SUMMARY OF THE INVENTION

The present invention comprises a fiber optic Sagnac interferometer employing high birefringence fiber, e.g., of the type described in Electronics Letters, Volume 18, Number 24 (Nov. 25, 1982), pages 1306 to 1308. Such high birefringence fiber reduces the average optical power transferred from one polarization mode to the other to about one percent or less over 1 km of fiber. As an approximation, the maximum phase error due to coupling between modes is equal to the fraction of power transferred between the modes. Thus, for a 1-km fiber loop having a power transfer rate of 1% per km, the maximum phase error would be 0.01 or $10^{-2}$ radians.

The present invention substantially reduces the maximum phase error by utilizing a wide band, short coherence length laser source in combination with the high birefringence fiber. The amount of reduction is dependent upon the "fiber coherence length", which is a newly coined term that should be distinguished from the coherence length of the source. As used herein, the term "fiber coherence length" is defined as the length of fiber required for the optical path length difference between the two polarization modes to equal one coherence length of the light source. It is approximately equal to the coherence length of the source divided by the difference in refractive index between the polarization modes. In general, the shorter the fiber coherence length, the greater the reduction in phase error. More specifically, use of a short fiber coherence length results in a phase error reduction which is proportional to $1/\sqrt{N}$, where N is the loop length divided by the fiber coherence length.

The fiber loop may thus be considered as being divided into N segments, each having a length of one fiber coherence length. Light coupled from one polarization mode to another over one segment (fiber coherence length) will add coherently over that segment but not thereafter. Further, after the waves have traversed the fiber loop, and are recombined, the only portions of the coupled light which will interfere with each other will be those which were coupled at symmetric segments of the fiber loop. Consequently, interference between lightwave components coupled between polarization modes is reduced dramatically, thereby reducing the birefringence-induced phase error. Through use of present, state of the art components, such reduction in interference provides, e.g., an additional factor of 100 improvement, so that the maximum phase error, assuming a 1 km, high birefringence fiber having a power transfer rate of 1%, decreases from $10^{-2}$ radians to $10^{-4}$ radians.

Further improvement in phase error reduction may be obtained by launching each of the orthogonal polarization modes with light that is uncorrelated and of substantially equal intensity (i.e., unpolarized light). To the extent that the intensities are equal and the phases are uncorrelated, phase differences between interfering cross-coupled light wave components will cancel, yielding a net non-rotationally-induced phase difference of zero. Assuming that the intensities are equalized to within 1% of each other, use of unpolarized light in combination with the high birefringence fiber and short coherence length source provides a further improvement of a factor of about 100 in the maximum phase error, reducing it to, e.g., $10^{-6}$ radians.

Thus, the present invention substantially eliminates the effects of birefringence-induced phase differences, permitting detection of the rotationally induced Sagnac phase difference with a high degree of accuracy.

In addition to reducing phase error, the present invention advantageously improves the stability of the detected output signal. Those skilled in the art will recognize that, even though an interferometer is perfectly reciprocal and generates no phase errors, the output signal may nevertheless vary in intensity. Such variations, in effect, change the "scale factor" or "proportionality factor" between the detected intensity and the rotation rate. In unpolarized light rotation sensors these variations are caused, e.g., by inteference between lightwave components which are coupled between polarization modes. Since the present invention reduces interference between such coupled lightwave components, these "scale factor" variations are reduced, thereby further improving performance of the rotation sensor.

These and other advantages of the present invention are best understood through reference to the drawings.

DESCRIPTION OF THE DRAWINGS

FIG. 1 shows a detection system for detecting the phase difference between waves counterpropagating through the fiber loop;

FIG. 6 is a vector diagram of the interference terms resulting from Group III electric field components;

FIG. 7 is a vector diagram showing a resultant vector which represents the vector sum of the two vectors of FIG. 6, and illustrating the phase error associated with such resultant vector sum;

FIG. 8 is a vector diagram showing the vectors of FIG. 6 equalized in magnitude;

FIG. 9 is a vector diagram of a resultant vector, which represents the vector sum of the vectors of FIG. 8, illustrating that phase errors may be eliminated by equalizing the magnitudes of the vectors;

DETAILED DESCRIPTION OF THE PREFERRED EMBODIMENT

Figure 1:
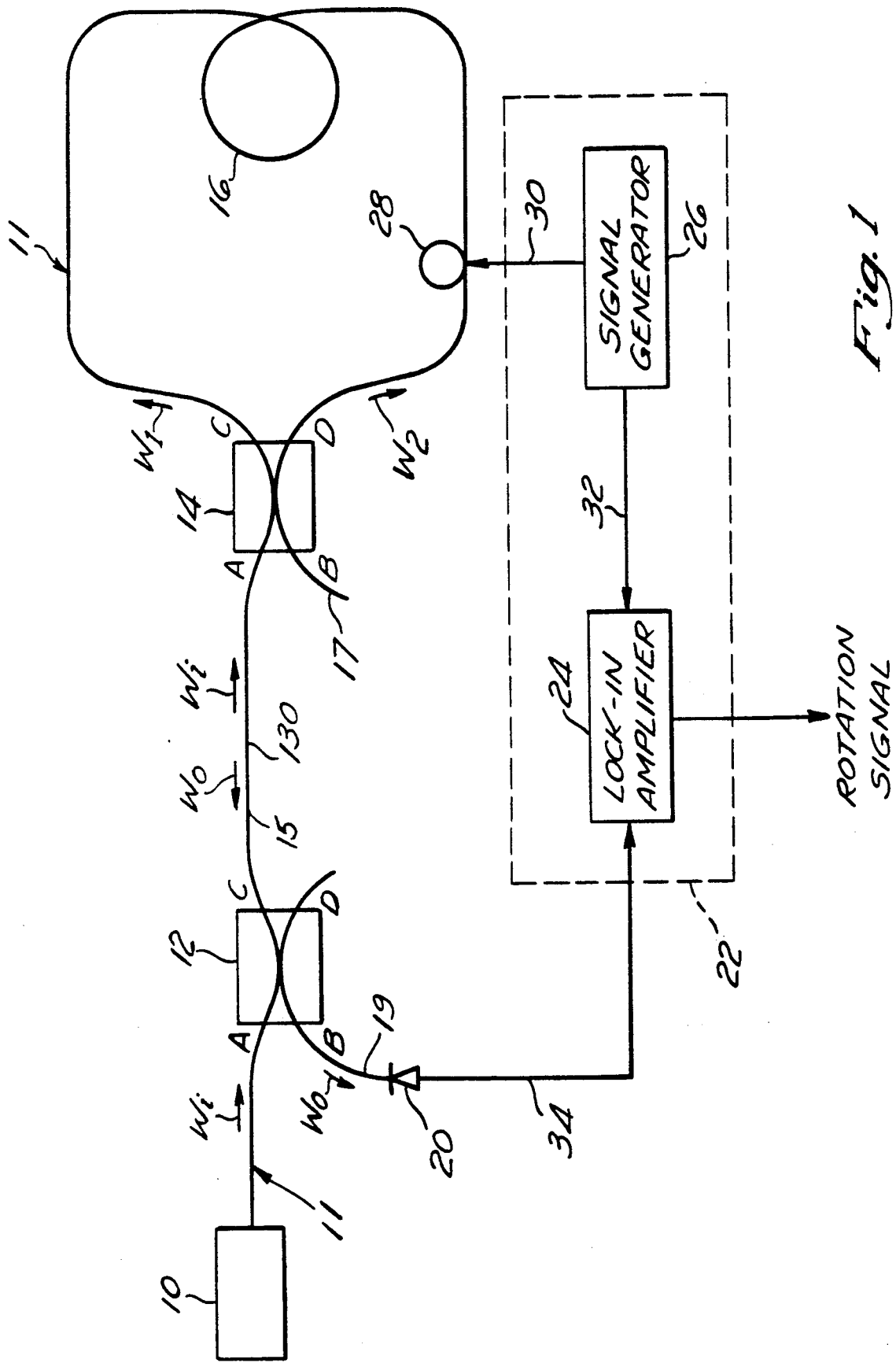
FIG. 1 is a schematic drawing of the rotation sensor of the present invention, showing a single, continuous strand of optical fiber, to which light from a light source is coupled, and showing the multimode sensing loop, formed from such single, continuous strand; in addition.

In the preferred embodiment, shown in FIG. 1, the rotation sensor of the present invention comprises a light source 10 for introducing a cw light wave into a single, continuous length or strand of single mode optical fiber 11. As used herein, "single mode fiber" means that the fiber supports only one fundamental mode for the particular source light used, as opposed to multimode fiber which supports more than one fundamental mode. However, it will be recognized that a single mode fiber includes two orthogonal polarization modes, each of which propogates light at a different velocity.

The fiber 11 passes through ports, labeled A and C, of a first directional coupler 12, and through ports, labeled A and C of a second directional coupler 14. Thus, the fiber 11 extends from the light source 10 to port A of the coupler 12 and extends from port C of the coupler 12 to port A of the coupler 14 to form a line segment 15 of fiber between the source 10 and coupler 14. The portion of the fiber 11 extending from port C of the coupler 14 is wound into a loop 16. By way of specific example, the loop 16 may comprise about 1400 turns, each bounding an area of about 150 sq. cm for a total loop length of 600 meters. The end of the fiber 11, from the loop 16, is passed through ports, labeled D and B, of the coupler 14, with port D adjacent to the loop 16. A small portion 17 of the fiber 11 extends from port B of the coupler 14 and terminates nonreflectively, without connection.

A second length of fiber 19 is passed through the ports labeled D and B of the coupler 12. The portion of the fiber 19 projecting from port D terminates nonreflectively, without connection. However, the portion of the fiber 19 projecting from port B of the coupler 12 is optically coupled to a photodetector 20, which produces an output signal proportional to the intensity of the light impressed thereon.

The present invention also includes detection electronics 22, comprising a lock-in amplifier 24, a signal generator 26, and a phase modulator 28. By way of specific example, the phase modulator 28 may comprise a PZT cylinder, having a diameter of e.g. about 1 to 2 inches, about which a portion of the fiber loop 16 is wrapped, e.g., 4 to 10 times. The fiber is bonded to the PZT cylinder 28 by a suitable adhesive, so that the fiber 11 will be stretched upon radial expansion of the cylinder 28. In this regard, the phase modulator 28 is driven by an AC modulating signal, having a frequency in the range of, e.g., 10-1000 kHz, which is provided on a line 30 from the signal generator 26. For proper operation of the detection electronics 22, it is important that the phase modulator 28 be located on one side of the loop 16, e.g., adjacent to the port D of the coupler 14, rather than at the center of the sensing loop 16.

The AC modulation signal from the generator 26 is also supplied on a line 32 to the lock-in amplifier 24. A line 34 connects the lock-in amplifier 24 to receive the detector 20 output signal. The amplifier utilizes the modulation signal from the generator 26 as a reference for enabling the amplifier 24 to synchronously detect the detector output signal at the modulation frequency. Thus, the amplifier 24 effectively provides a band pass filter at the fundamental frequency (i.e., the frequency of modulation) of the phase modulator 28, blocking all other harmonics of this frequency. It will be understood by those skilled in the art that the magnitude of this harmonic component of the detector output signal is proportional, through an operating range, to the rotation rate of the loop 16. The amplifier 24 outputs a signal which is proportional to this first harmonic component, and thus, provides a direct indication of the rotation rate.

Additional details of the detection electronics 22 are described in international patent application No. PCT/U.S. 82/00400 published Oct. 14, 1982, as publication No. WO 82/03456, and entitled "Fiber Optic Rotation Sensor", and in corresponding U.S. patent application Ser. No. 307,095, filed Sep. 30, 1981, which is a continuation-in-part of U.S. patent application Ser. No. 249,714, filed Mar. 31, 1981. These applications are incorporated herein by reference. This detection system is also described in *Optics Letters*, Vol. 6, No. 10, (October 1981) pp. 502-504.

In the embodiment shown, the fiber 11 comprises a highly birefringent single mode fiber, e.g., of the type described in the article entitled "Fabrication of Polarization Maintaining Fibres Using Gas-Phase Etching", *Electronics Letters*, Vol. 18, No. 24, p. 1306 (Nov. 25, 1982).

The light source 10 should provide light which has a short coherence length. A preferred light source for use as the source 10 is a superradiance diode, e.g., of the type described in the article entitled "High Power Low Divergence Superradiance Diode", *Applied Physics Letters*, Vol. 41, No. 7 (Oct. 1, 1982).

The photodetector 20 is a standard pin or avalanchetype photodiode, which has a sufficiently large surface area to intercept substantially all of the light exiting the fiber 19, when positioned normal to the fiber axis. The diameter of the photodetector 20 is typically in the range of about 1 millimeter, the exact size depending upon the diameter of the fiber 19, the numerical aperture of the fiber 19 (which defines the divergence of the light as it exits the fiber 19) and the distance between the end of the fiber 19 and the photodetector 20.

In operation, a light wave $W_i$ is input from the light source 10 for propagation through the fiber 11. As the wave $W_i$ passes through the coupler 12, a portion of the light (e.g. 50 per cent) is lost through port D. The remaining light propagates from port C of the coupler 12 to the coupler 14, where the light is split evenly into two waves $W_1, W_2$, which propagate in opposite directions about the loop 16. After traverse of the loop 16, the waves $W_1, W_2$ are recombined by the coupler 14 to form an optical output signal $W_0$. A portion of the recombined wave $W_0$ may be lost through the port B of the coupler 14, while the remaining portion travels from port A of the coupler 14 to port C of the coupler 12, where it is again split, with a portion thereof (e.g., 50%) transferred to the fiber 19. Upon exiting the end of the fiber 19, the wave $W_0$ is impressed upon the photodetector 20, which outputs an electrical signal that is proportional to the optical intensity of the wave $W_0$.

The intensity of this optical output signal will vary in proportion to the type (i.e., constructive or destructive) and amount of interference between the waves $W_1, W_2$, and thus, will be a function of the phase difference between the waves $W_1, W_2$. Assuming, for the moment, that the fiber 11 is "ideal" (i.e., that the fiber has no birefringence, or that the birefringence does not change with time), measurement of the optical output signal intensity will provide an accurate indication of the rotationally induced Sagnac phase difference, and thus, the rotation rate of the fiber loop 16.

As indicated above, present state-of-the-art, fibers are far from "ideal", in that 1) they are birefringent, and 2) the birefringence is environmentally sensitive and tends to vary, thus, yielding nonrotationally induced phase differences (i.e., phase errors), which are indistinguishable from the rotationally induced Sagnac phase difference. The present invention utilizes three different techniques to reduce or eliminate these phase errors, namely, 1) the use of a high birefringence fiber to reduce coupling between the polarization modes; 2) the use of a wideband, highly incoherent light source in combination with the high birefringence fiber to reduce interference between lightwave components which have been coupled between polarization modes; and 3) equalizing the lightwave intensity in each of the two polarization modes to cause the phase differences between interfering components of light which has been coupled between polarization modes to cancel.

PHASE ERROR ANALYSIS

Figure 2:
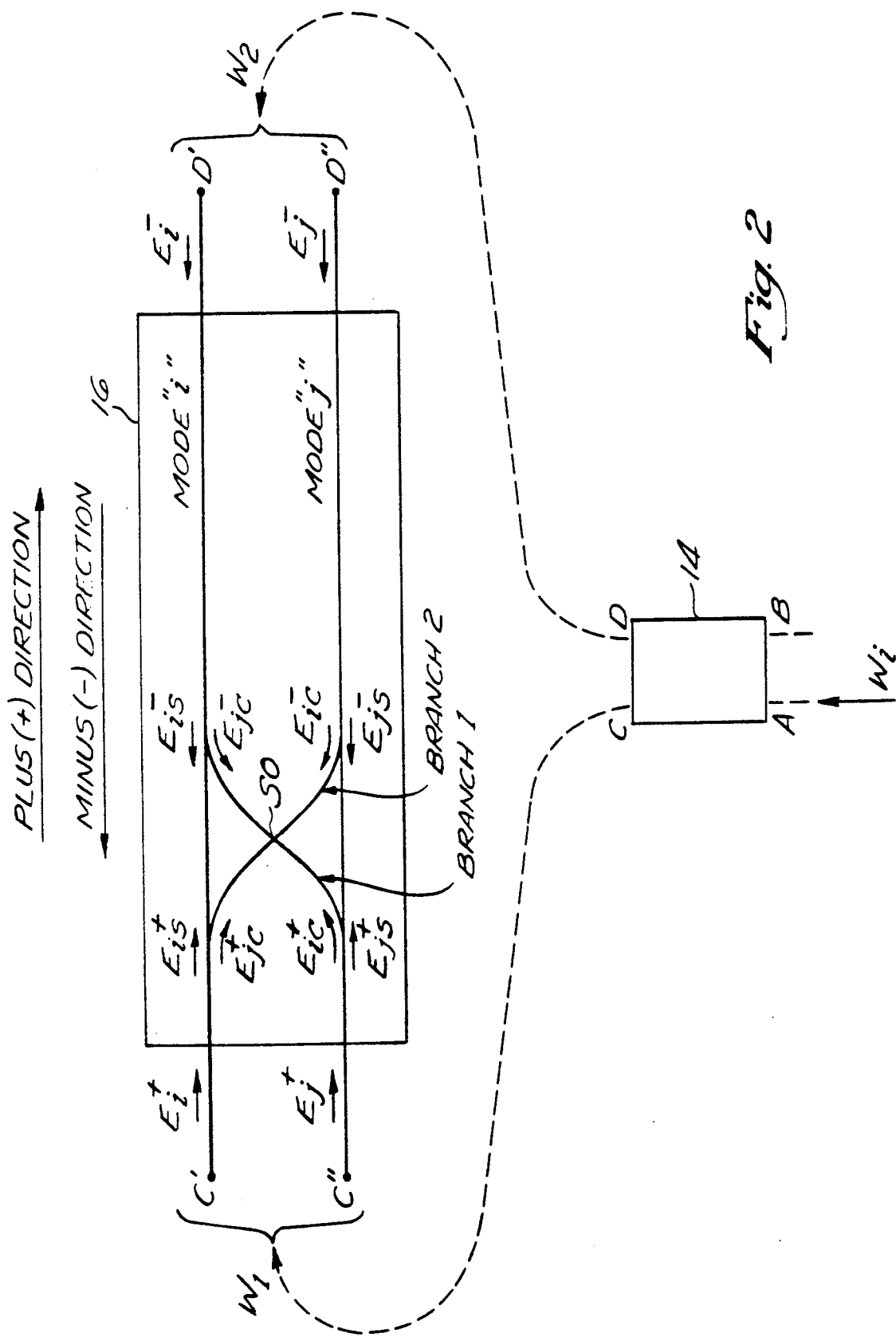
FIG. 2 is a schematic drawing illustrating a conceptual model of the fiber loop, showing, for an exemplary pair of polarization modes, the electric field components of the counterpropagating waves as they traverse the fiber loop.

Such reduction or elimination of phase errors may be more fully understood through reference to FIG. 2, which depicts a conceptual model of the two orthogonal polarization modes of a single mode fiber. Each polarization mode has a propogation velocity different from that of the other polarization mode. Further, it is assumed that there is coupling of light energy between modes, which may be caused e.g. by variations or perturbations in the principal axes of birefringence of the fiber. Such coupling of energy will be referred to herein as "cross coupling."

The conceptual fiber model of FIG. 2 will be utilized to represent the sensing loop 16 (FIG. 1). The counterpropagating waves $W_1$, $W_2$, are schematically represented as being coupled, by the coupler 14, to the loop 16, by the dashed arrows. The two polarization modes of the single mode optical fiber are schematically represented in FIG. 2 by a first line, connecting a pair of terminals C' and D', and a second line, parallel to the first line, connecting a second pair of terminals C" and D". The terminals C' and C" on the left side of FIG. 2 correspond the port C of the coupler 14, while the terminals D' and D" on the right side of FIG. 2 correspond to the port D of the coupler 14. The above mentioned first and second lines connecting the terminals will be used to represent arbitrary modes i and j, respectively, of the fiber loop 16.

Cross coupling between the modes i and j is represented by a pair of lines, labeled "Branch 1" and "Branch 2", respectively. Branch 1 represents cross coupling between the terminials C" and D' while branch 2 represents cross coupling between terminals C' and D". The intersection of branch 1 with branch 2, designated by the referenced numeral 50, will be referred to as the "coupling center". It will be understood that no coupling exist between the two branches 1 and 2. The coupling center 50 is shown as being offset from the center of the fiber loop 16 to illustrate that the coupling between the polarization modes is not uniform along its length. Therefore, cross coupled light will travel a longer path in one of the modes than the other, yielding a nonrotationally induced phase difference therebetween. Moreover, it will be understood that, in reality, the fiber birefringence, being environmentally sensitive, varies with time, thus making the optical paths travelled by the cross-coupled light also time varying.

As shown in FIG. 2, the wave of $W_1$ is coupled to the fiber loop 16 so that the modes i and j are launched with electric field amplitudes $E_i^+$ and $E_j^+$ respectively. Similarily, the wave $W_2$ is coupled to launch each of the modes i and j with electric field amplitudes $E_i^-$ and $E_j^-$, respectively. The plus (+) and minus (−) superscripts designate the direction of propegation, the clockwise direction about the loop 16 being designated by the plus (+) sign, and the counterclockwise direction around the loop 16 being designated by the minus (−) sign.

As light in each of the modes i and j traverses the fiber loop 16, energy is coupled between the modes, so that each electric field is divided into two components, namely, a "straight through" component, designated by the subscript "s", and a "cross coupled" component, designated by the subscript "c". Thus, $E_i^+$ is divided into a straight through component $E_{is}^+$ which remains in mode i during traverse of the loop 16, and a cross coupled component $E_{jc}^+$, which is cross coupled to mode j during traverse of the loop 16. Similarily, $E_i^-$ is divided into components $E_{is}^-$ and $E_{jc}^-$; $E_j^+$ is divided into components $E_{ic}^+$ and $E_{js}^+$; and $E_j^-$ is divided into components $E_{js}^-$ and $E_{ic}^-$.

Figure 3:
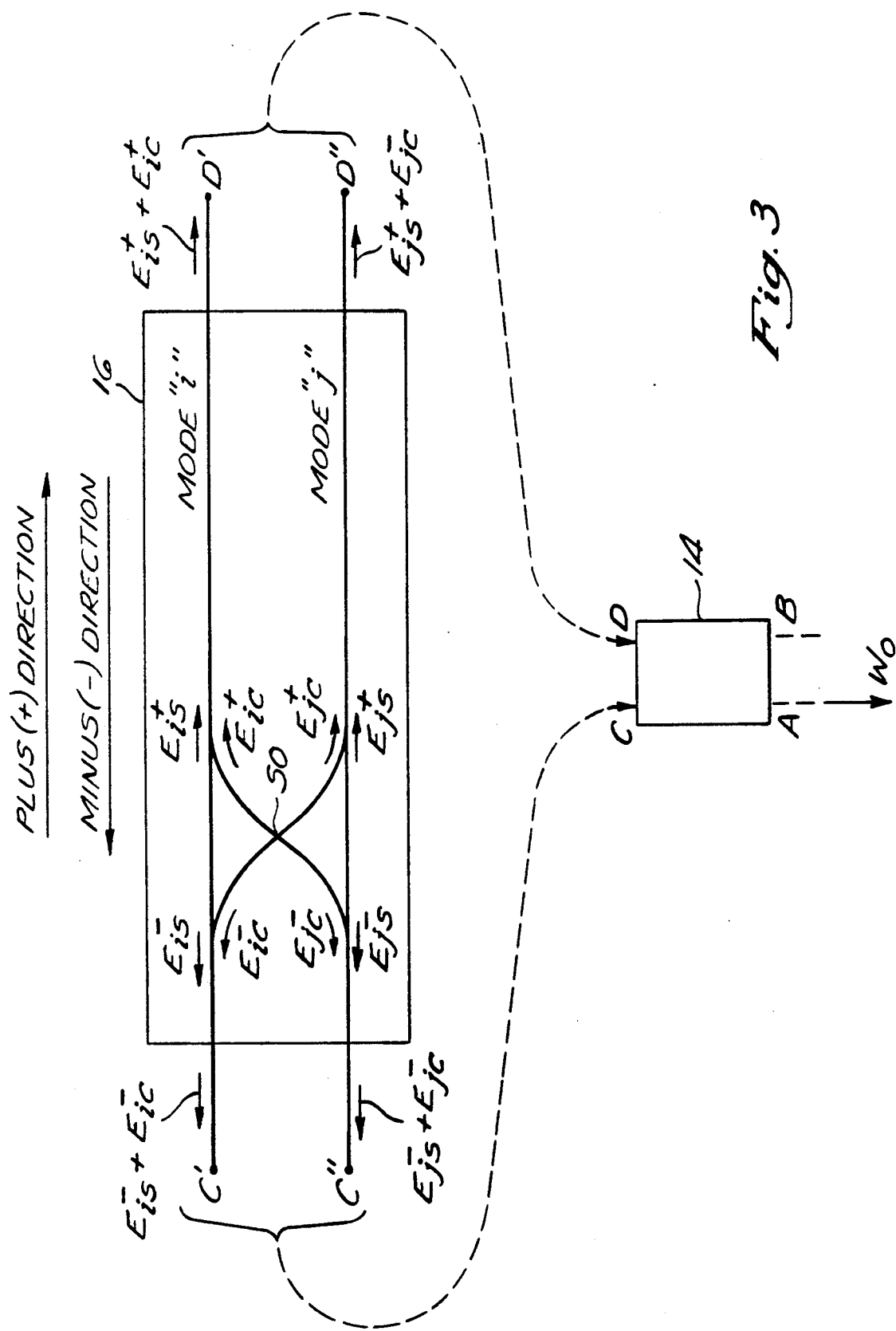
FIG. 3 is a schematic drawing of the conceptual model of FIG. 2, showing the electric field components of the counterpropagating waves after they have traversed the fiber loop.

After the light waves have traversed the fiber loop 16, the light at terminal C' will comprise components $E_{is}^-$ and $E_{ic}^-$; the light at terminal C" will comprise component $E_{js}^-$ and $E_{jc}^-$; the light at terminal D' will comprise components $E_{is}^+$ and $E_{ic}^+$; and the light at terminal D" will comprise components $E_{js}^+$ and $E_{jc}^+$, as shown in FIG. 3. These 8 electric field components are combined by the coupler 14 to form the optical output signal $W_0$. It will be recognized by those skilled in the art that, in general, superposition of any two electric field components, e.g., $E_{is}^+$ and $E_{ic}^+$ will yield a resultant intensity (I), as measured by the detector 20, which may be defined as follows:

$$I = |E_{is}^+|^2 + |E_{ic}^+|^2 + 2|E_{is}^+||E_{ic}^+|\cos\phi \tag{1}$$

where, in this particular example, $\phi$ is the phase difference between field components $E_{is}^+$ and $E_{ic}^+$.

The first two terms of equation (1), namely $|E_{is}^+|^2$ and $|E_{ic}^+|^2$ are steady-state or "d.c." terms, while the last term is an "interference" term having a magnitude depending upon the phase difference $\phi$ between the fields $E_{is}^+$ and $E_{ic}^+$.

In general, all 8 of the above fields $E_{is}^-$, $E_{ic}^-$, $E_{js}^-$, $E_{jc}^-$, $E_{is}^+$, $E_{ic}^+$, $E_{js}^+$ and $E_{jc}^-$.

will interfere with each other to provide an optical intensity at the detector 20 (FIG. 1) comprised of 8 "dc" terms, which are not phase-dependent, and 28 "interference" terms which are phase-dependant. The number of combinations of phase-dependant terms is actually n(n−1) or 56 phase-dependent terms. However, one-half of these terms are simply the re-ordered forms of the other half, yielding 28 non-redundant terms.

Figure 4:
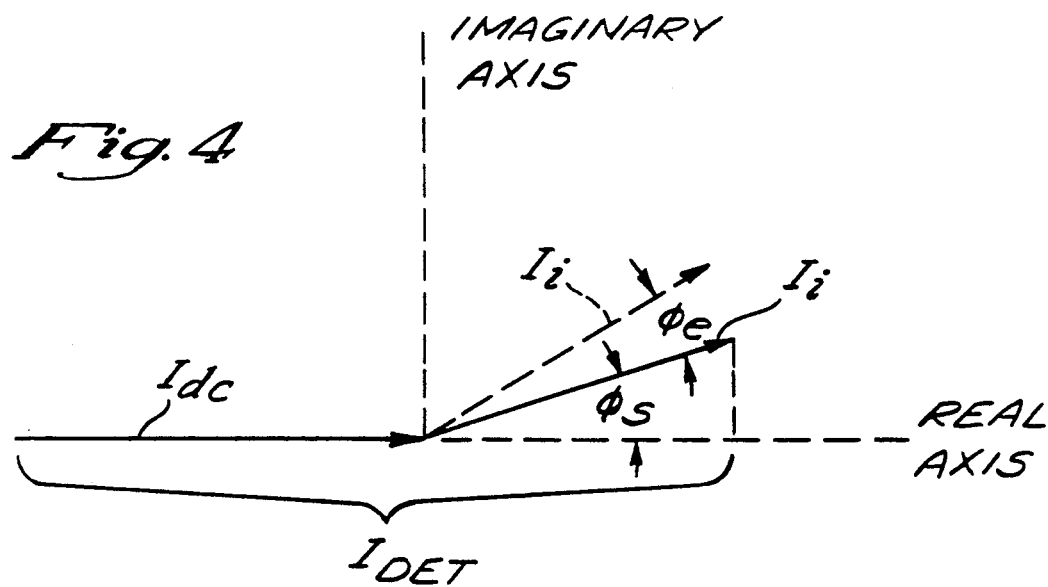
FIG. 4 is a vector diagram of the optical output signal, showing a vector directed along the real axis, which represents the vector sum of the "dc" terms resulting from the electric field components shown in FIG. 3, and another vector, rotating in the manner of a phasor, which represents the vector sum of the interference terms resulting from the electric field components shown in FIG. 3, and further illustrating the response of the vector representing the interference terms to 1) the rotationally-induced Sagnac phase difference, and 2) phase errors caused by non-rotationally induced phase differences.
Figure 5:
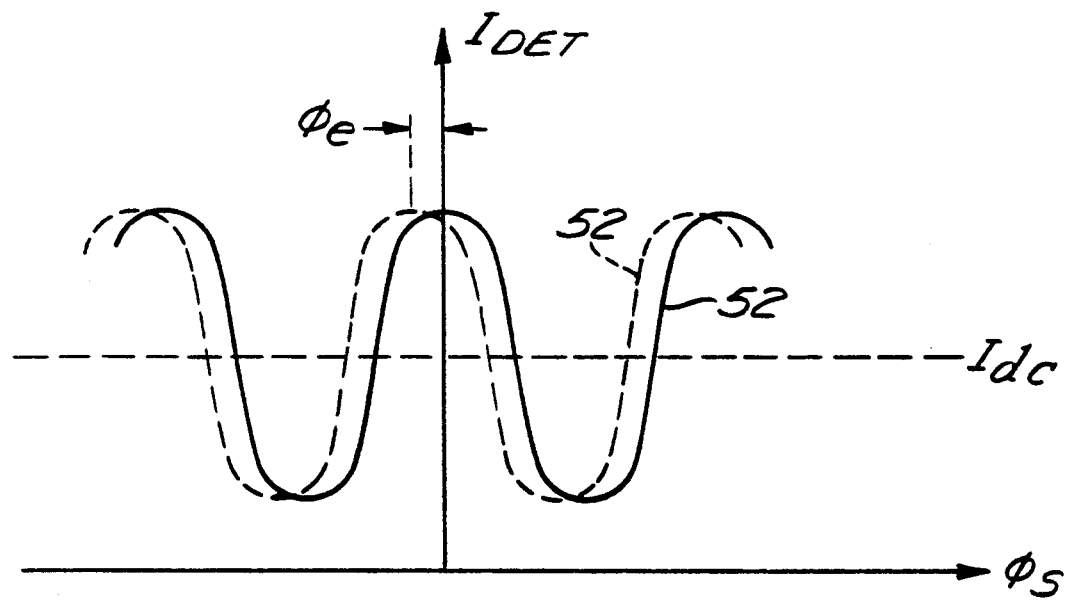
FIG. 5 is a graph, corresponding to the vector diagram of FIG. 4, of the optical intensity, as measured by the detector, versus the Sagnac phase difference, illustrating the effect of non-rotationally induced phase errors.

The 8 dc terms are shown in FIG. 4 as a single vector sum, labeled $I_{dc}$, while the 28 interference terms are shown in FIG. 4 as a single vector, labeled $I_i$. These vectors $I_{dc}$ and $I_i$ are plotted in a complex plane. Upon rotation of the fiber loop 16 (FIG. 1) the phase-dependent vector $I_i$ rotates, in the manner of a phasor, through an angle equal to the rotationally reduced phase difference $\phi_s$ due to the Sagnac effect. The projection of the interference vector $I_i$ upon the real axis, when added to the vector $I_{dc}$, yields the total optical intensity $I_{DET}$ of the optical output signal $W_0$, as measured by the detector 20 (FIG. 1). In FIG. 5, this optical intensity $I_{DET}$ is plotted as function of the Sagnac phase difference $\phi_s$, as illustrated by the curve 52.

As indicated above in reference to FIG. 2, cross coupling between the modes i and j can cause the fiber loop 16 to be nonreciprocal, resulting in a nonrotationally induced phase difference between the above described electric field components, and yielding an accumulated phase error $\phi_e$, which is indistinguishable from the rotationally induced Sagnac phase difference $\phi_s$. The phase error $\phi_e$ causes the phasor $I_i$ to be rotated, e.g., from the position shown in solid lines to the position shown in dotted lines in FIG. 4. This results in the curve 52 of FIG. 5 being translated by an amount $\phi_e$ e.g., from the position shown in solid lines to the position shown in dotted lines in FIG. 5.

Elimination or reduction of the accumulated phase error $\phi_e$ requires an analysis of the 28 interference terms resulting from superposition of the 8 electric field components discussed in reference to FIG. 2. At the outset, it will be recognized that interference between electric field components $E_{is}^+$ with $E_{is}^-$, and $E_{js}^+$ with $E_{js}^-$, result in no phase error contribution, since the light represented by these components is not cross coupled, and traverses the loop in a single one of the modes. However, the remaining 26 interference terms can contribute to the accumulated phase error $\phi_e$. These 26 interference terms correspond to 26 pairs of electric field components which may be classified into 3 groups, namely, Group I, Group II, and Group III, as follows:

| Group I | Group II | Group III |
|---|---|---|
| $E_{is}^+$ and $E_{ic}^+$ | $E_{is}^+$ and $E_{jc}^-$ | $E_{ic}^+$ and $E_{ic}^-$ |
| $E_{is}^+$ and $E_{ic}^-$ | $E_{is}^+$ and $E_{js}^-$ | $E_{jc}^+$ and $E_{jc}^-$ |
| $E_{is}^-$ and $E_{ic}^+$ | $E_{is}^+$ and $E_{jc}^+$ | |
| $E_{is}^-$ and $E_{ic}^-$ | $E_{is}^+$ and $E_{js}^+$ | |
| $E_{js}^+$ and $E_{jc}^+$ | $E_{ic}^+$ and $E_{js}^-$ | |
| $E_{js}^+$ and $E_{jc}^-$ | $E_{ic}^+$ and $E_{js}^-$ | |
| $E_{js}^-$ and $E_{jc}^+$ | $E_{ic}^+$ and $E_{jc}^+$ | |
| $E_{js}^-$ and $E_{jc}^-$ | $E_{ic}^+$ and $E_{js}^+$ | |
| | $E_{ic}^-$ and $E_{jc}^-$ | |
| | $E_{ic}^-$ and $E_{js}^-$ | |
| | $E_{ic}^-$ and $E_{jc}^+$ | |
| | $E_{ic}^-$ and $E_{js}^+$ | |
| | $E_{is}^-$ and $E_{jc}^-$ | |
| | $E_{is}^-$ and $E_{js}^-$ | |
| | $E_{is}^-$ and $E_{jc}^+$ | |

| Group I | Group II | Group III |
|---|---|---|
| | $E_{is}^-$ and $E_{js}^-$ | |

Although only the interfering electric field components are listed above, and not the interference terms themselves, it will be understood that the interference term for each of the above listed pairs of components may be readily calculated in accordance with the example provided in reference to equation (1).

ELIMINATION OF GROUP I ERRORS

Group I includes those pairs of field components which originated in different modes, but which are in the same mode upon reaching the coupler 14, after traversing the loop 16. For example, the first of Group I pair of components comprises a straight-through component $E_{is}^+$, which originated in mode i and remained in mode i during traverse of the loop 16, and a cross coupled component $E_{ic}^+$ which originated in mode j but was cross coupled to mode i during traverse of the loop 16. Ordinarily, these components would interfere with each other, as described in reference to equation (1).

However, if the phase difference between these light wave components is random, interference between the light wave components will be averaged to zero in the detector 20. Accordingly, Group I interference terms can be eliminated by insuring that, upon reaching the coupler 14, and thus the loop 16, the light in each mode is incoherent, i.e., random in phase with respect to the light in the other mode. Thus, for example, if the light in mode i is incoherent with respect to light in mode j, the interference between, e.g., the components $E_{is}^+$ and $E_{ic}^+$, will be averaged to zero in the detector 20. Similarly, the interference between the remaining components, e.g., $E_{is}^+$ and $E_{ic}^-$; $E_{is}^-$ and $E_{ic}^+$; etc., will be averaged to zero.

Such incoherence between Group I components is achieved in the present invention by using the high birefringence fiber 11 in combination with the short coherence length light source 10. Specifically, the birefringence of the fiber 11 and the coherence length of the source 10 should be selected such that there is at least one "fiber coherence length" between the source 10 and the coupler 14. As used herein, "fiber coherence length" is defined as the length of fiber required for the optical path length difference between the two polarization modes to equal one coherence length of the light source 10. As a good approximation, the fiber coherence length is equal to the coherence length of the source 10 divided by the difference in refractive index between polarization modes. Accordingly, by utilizing a sufficiently short coherence length source 10, in combination with a sufficiently high birefringence fiber 11, interference between the components listed in Group I and thus, phase errors caused by such interference, may be eliminated.

It will be understood by those skilled in the art that the optical path lengths of the fiber modes may be measured or calculated, using modal dispersion data provided by the manufacturer of the fiber.

ELIMINATION OF GROUP II ERRORS

Group II includes those pairs of electric field components which are in different modes, after traverse of the loop 16, regardless of the mode in which they originated. Thus, for example, field component $E_{is}^+$, in mode i is paired with component $E_{jc}^-$, in mode j. Since the modes, i and j are orthogonal, and since the electric fields of orthogonal modes do not interfere, there will be no interference between the terms in Group II. It is important to recognize, however, that the field patterns of the paired electric fields in Group II are only orthogonal in a "global" sense. That is, the entire field patterns must be spatially averaged over a plane normal to the fiber axis to eliminate interference. If such spatial averaging is accomplished for only a portion of the field patterns, orthogonality may not exist. To ensure that substantially the entire field patterns of the polarization modes i and j are spatially averaged, the present invention utilizes a detector 20 which has a surface area sufficiently large to capture substantially all of the light exiting the end of the fiber 19, as discussed above.

ELIMINATION OF GROUP III ERRORS THROUGH USE OF UNPOLARIZED LIGHT

Only two interference terms result from the pairs of electric field components listed in Group III, namely, an interference term resulting from superposition of the component $E_{ic}^+$ with $E_{ic}^-$, and another interference term resulting from superposition of the components $E_{jc}^+$ with $E_{jc}^-$. Thus, each interference term results from a pair of components, one of which originated in a first mode and, during traverse of the loop 16 was cross coupled to a second mode, while the other originated in that same first mode and was cross coupled to the same second mode, but traversing the loop 16 in the opposite direction. These interference terms, while being only two in number, are highly sensitive to the environment and can result in a phase error which may be orders of magnitude larger than the Sagnac phase difference.

The interference between $E_{ic}^+$ and $E_{ic}^-$ yields a phase dependent term:

$$aL|E_j|^2 \cos(\phi_s + \phi_p - \phi_q) \quad (5)$$

Similarly, the interference between $E_{jc}^+$ and $E_{jc}^-$ yields a phase dependent term:

$$aL|E_i|^2 \cos[\phi_s - (\phi_p - \phi_q)] \quad (6)$$

Where $\alpha$ is the fraction of the optical power that is coupled between the i and j modes per unit of fiber length (e.g. km); L is the length of the fiber loop 16 (e.g. in km); $\phi_s$ is the rotationally induced, Sagnac phase difference between the two components; $\phi_p$ is the total accumulated phase for light that is cross coupled from one mode to another between the terminals C'' and D'; $\phi_q$ is the total accumulated phase for light that is cross coupled from one mode to the other between terminals C' and D''.

The vectors corresponding to these interference terms (5) and (6) are plotted in a complex plane in FIG. 6, as the vectors 56 and 58, respectively. The vector 56 represents light which has been coupled from the j mode to the i mode and the vector 58 represents light which has been coupled from the i mode to the j mode. It will be understood that the interference terms (5) and (6) are merely the projections of the vectors 56 and 58 respectively, upon the real axis. The i mode vector 56 and j mode vector 58 may be vectorially added to yield a resultant vector 60, shown in FIG. 7. Note that, for clarity of illustration, the Sagnac phase difference $\phi_s$ is assumed to be zero in FIGS. 6 and 7. Further, although the phase angle $\phi_p - \phi_q$ for the vectors 56, 68 is necessarily shown in the drawings as being constant, it will be recognized that this angle is environmentally sensitive and can vary with time between zero and 360°.

As shown in FIG. 7, the vector 60 is inclined from the real axis by a phase angle $\phi_{e(III)}$, which represents the non-rotationally induced phase error contribution to the total phase error $\phi_e$ (FIG. 4) that is due to interference between the components of Group III. The projection of the vector 60 upon the real axis is simply the algebraic sum of the two interference terms (5) and (6):

$$aL\{|E_j|^2 \cos(\phi_s + \phi_p - \phi_q) + |E_i|^2 \cos[\phi_s - (\phi_p - \phi_q)]\} \quad (7)$$

Since the detector 20 measures that component of the vector 60 which is along the real axis, the detector 20 output will be a function of the algebraic sum (7). Thus, it may be seen that the Group III phase error $\phi_{e(III)}$ (FIG. 7) will cause a corresponding error in the detector 20 output.

The algebraic sum (7) of the interference terms may be rewritten as follows:

$$aL[(|E_i|^2 + |E_j|^2) \cos(\phi_p - \phi_q) \cos\phi_s + (|E_i|^2 - |E_j|^2) \sin(\phi_p - \phi_q) \sin\phi_s] \quad (8)$$

Note that, if $|E_i|^2$ and $|E_j|^2$ are equal, this algebraic sum (8) reduces to:

$$2aL|E|^2 \cos(\phi_p - \phi_q) \cos\phi_s \quad (9)$$

Figure 10:
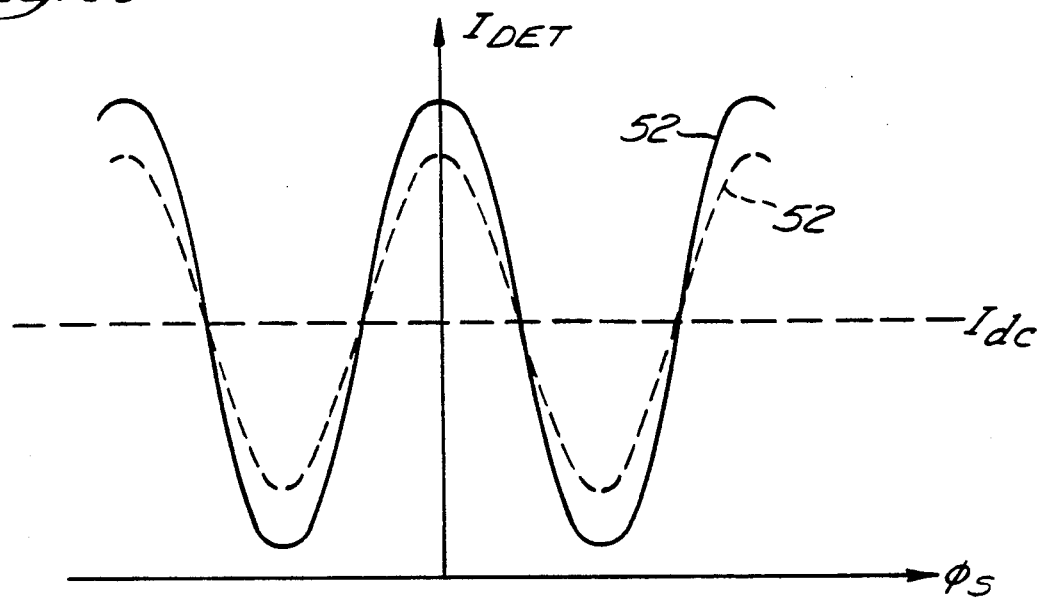
FIG. 10 is a graph of the optical intensity, as measured by the detector, versus the Sagnac phase difference, illustrating the effect of changes in the magnitude of the interference factor of FIG. 4, assuming a phase error of zero.

In this form, the effect of variations in the quantity $\phi_p - \phi_q$ can be distinguished from the rotationally induced Sagnac phase difference $\phi_s$, as may be more fully understood through reference to FIGS. 8 and 9, which show the effect, upon the resultant vector 60, of making the vectors 56 and 58 equal in magnitude. It will be seen that, regardless of the value of the quantity $\phi_p - \phi_q$, the resultant vector 60 will always be directed along the real axis, and thus, the direction of the vector 60 is independent of variations in the quantity $\phi_p - \phi_q$. However, such variations in $\phi_p - \phi_q$ will cause the Group III resultant vector 60 to fluctuate in magnitude, which will cause the signal measured by the detector 20 to concomitantly fluctuate. That is, variations in $\phi_p - \phi_q$ will still cause the magnitude of the output waveform 52 to increase or decrease, e.g., from the position shown in solid lines in FIG. 10 to the position shown in dotted lines, but so long as the vectors 56 and 58 are equal in magnitude, the output waveform 52 will not shift laterally along the X-axis, as did the waveform 52 in FIG. 5. Thus, so far as Group III errors are concerned, equalizing the light intensity in each of the two polarization modes will eliminate phase errors, but not scale factor problems. Further, in practice, it is difficult to make the light intensity for the modes precisely equal, so there may be at least a small phase error due to Group III components.

Preferably, the light in both polarization modes should be substantially equalized with respect to intensity so that the light is substantially unpolarized by the time it reaches the coupler 14 and is split into the counterpropagating waves. This insures that the Group III interference terms have the proper magnitudes for substantial cancellation of the phase error at the detector 20. As used herein, the terms "substantially equalized" or "substantially unpolarized" means that the respective intensities of light in the modes are within 10% of each other. It will be understood that presently available light sources typically have both polarized and unpolarized components, so that the source light may have a degree of polarization. To equalize the light intensity when the wide band source 10 is not completely unpolarized, the source 10 should preferably be oriented such that its major axis of polarization is 45° relative to the principal axes of birefringence.

ELIMINATION OF GROUP III ERRORS THROUGH USE OF A HIGH BIREFRINGENCE FIBER/SHORT COHERENCE LENGTH SOURCE

The present invention provides a novel technique for reducing the phase error contribution of Group III components, which, advantageously, may be used in combination with the above-discussed method relating to unpolarized light, or it may be used independently.

The technique comprises utilizing the high birefringence fiber 11 in combination with the short coherence length source 10 to reduce the magnitude of the vectors 56, 58 (FIG. 6) and concomitantly reduce the magnitude of the Group III resultant vector 60 (FIG. 7). Although such reduction in vector magnitude will not change the phase angle $d_{e(III)}$ (FIG. 7) of the Group III resultant vector 60, such decrease does reduce the fraction of the total interference $I_i$ (FIG. 4) contributed by the vector 60, thus reducing the overall significance of the Group III interference terms and their effect on the total phase error $\phi_e$ (FIG. 4). Further, such reduction in vector 60 magnitude reduces scale factor problems, since its contribution to the detected intensity or the output waveform 52 (FIG. 10) is reduced, thereby resulting in improved stability.

Reduction in the magnitude of the vector 60 is accomplished in two ways. First, the high birefringence fiber 11 tends to conserve polarization and reduce cross coupling between the polarization modes. This reduces the value of αL in expression 7, thus, reducing the magnitude of the vector 60. To a good approximation, the total phase error $\phi_e$ (FIG. 4) may be expressed as follows:

$$\phi_e \approx 2\alpha L \sin(\phi_p - \phi_q) \frac{|E_j|^2 - |E_i|^2}{|E_j|^2 + |E_i|^2} \quad (10)$$

As an indication of the phase error magnitude with the high birefringence fiber, it will be noted that the maximum phase error $\phi_{e(max)}$ will occur when (1) the quantity $(\phi_p - \phi_q)$ of expression 10 is 90°, and (2) only one of the modes is launched with light so that either $E_i$ or $E_j$ is zero. Assuming that the total phase error $\phi_e$ (FIG. 4) is due entirely to Group III components, the maximum phase error may be approximated as:

$$\phi_{e(max)} \approx 2\alpha L \quad (11)$$

For presently available high birefringence fibers, the value of α is typically on the order of 0.01 per km. Thus, use of a high birefringence fiber such as the fiber 11, results in a total phase error $\phi_e$ on the order of $10^{-2}$ radians, assuming a loop length of 1 km.

The magnitude of the vector 60 (FIG. 7) may be further reduced by using the wide band, short coherence length source 10 in combination with the high birefringence fiber 11. Specifically, the source 10 and the fiber 11 should be selected to provide a combination of sufficiently short source coherence length and sufficiently high fiber birefringence so that the loop 16 is comprised of plural fiber coherence lengths. It will be recalled that the "fiber coherence length" is defined as the length of fiber required for the optical path length difference between the two polarization modes to equal one coherence length of the source 10. As a good approximation, the fiber coherence length may be expressed as:

$$l_c \approx \frac{L_c}{\Delta n} \quad (12)$$

where: $l_c$ is the fiber coherence length; $L_c$ is the coherence length of the source and $\Delta n$ is the difference in refractive index between the two polarization modes of the fiber.

By making the fiber coherence length sufficiently short, such that the fiber loop 16 is comprised of plural fiber coherence lengths, the coherence between portions of the waves which are coupled from one mode to the other during traverse of the loop, is reduced, thereby reducing the interference.

Figure 11:
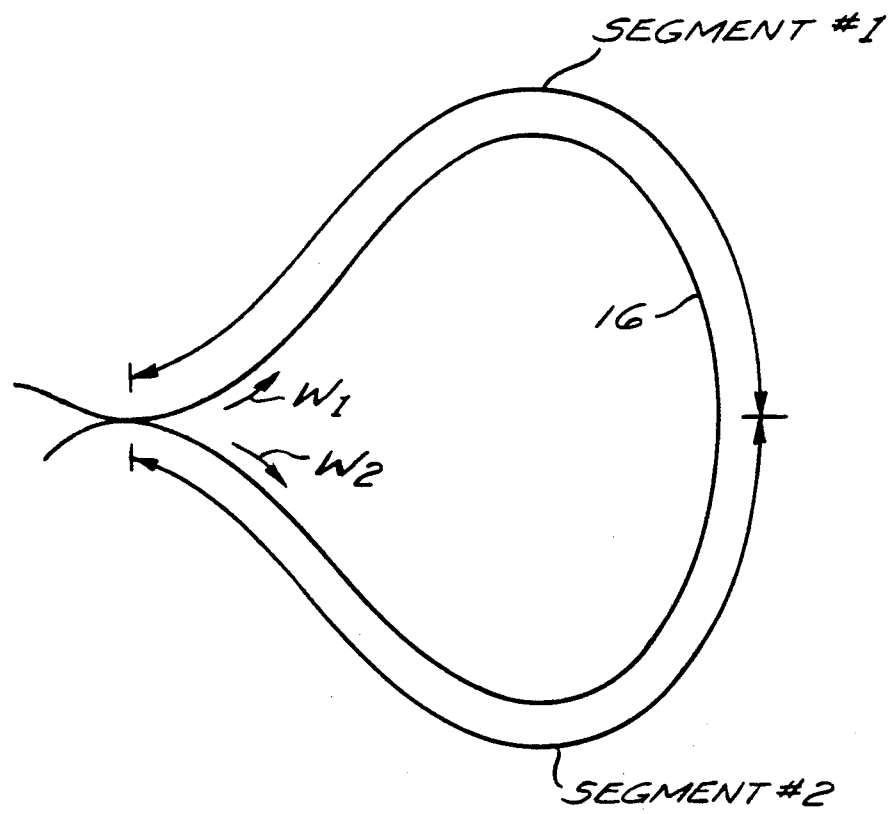
FIG. 11 is a schematic drawing illustrating the fiber loop divided into two segments, each having a length of one fiber coherent length.

The foregoing may be understood more fully through reference to FIG. 11 which schematically illustrates the fiber loop 16 of FIG. 1. As shown therein, the loop 16 is divided into plural segments, each of which has a length equal to one fiber coherence length ($l_c$). It will be understood that while only two segments are shown in FIG. 11 for illustrative purposes, a greater number of segments is preferable. The number of segments (N) is determined by the fiber coherence length $l_c$ and the loop length L, such that:

$$N = \frac{L}{l_c} \quad (13)$$

The fiber coherence length, in turn, is determined by the birefringence of the fiber 11 and coherence length of the source 10, in accordance with equation 12. Thus, for example, if the fiber 11 and source 10 are chosen such that the fiber coherence length is 100 meters, there will be 10 segments within a 1,000 meter fiber loop.

Figure 12:
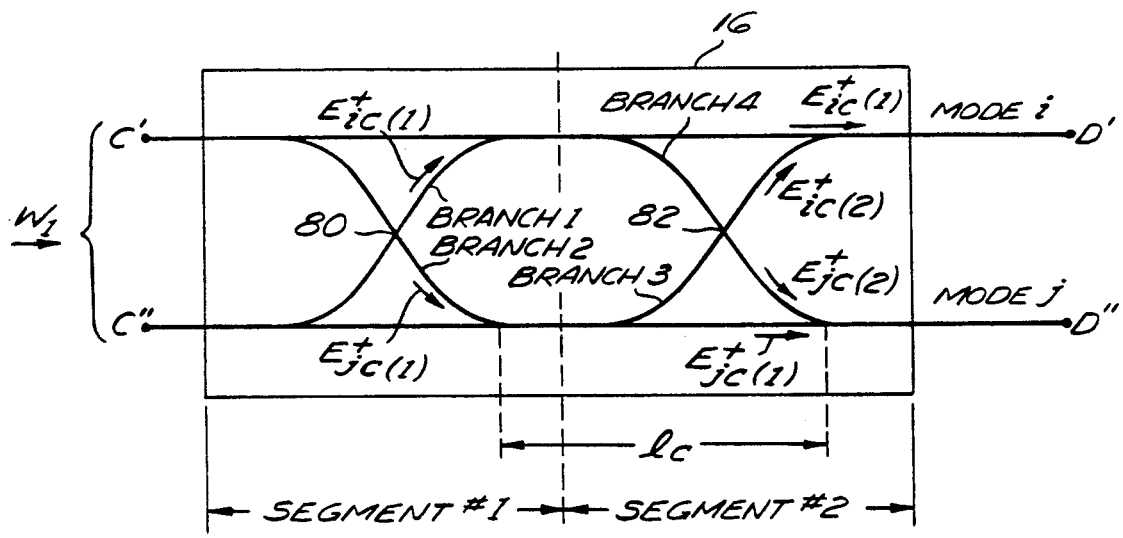
FIGS. 12 and 13 are schematic drawings illustrating conceptual models of the fiber loop, showing, for an exemplary pair of polarization modes, the cross coupled electric field components of the counterpropagating waves as they traverse the plural segment loop of FIG. 11.
Figure 13:
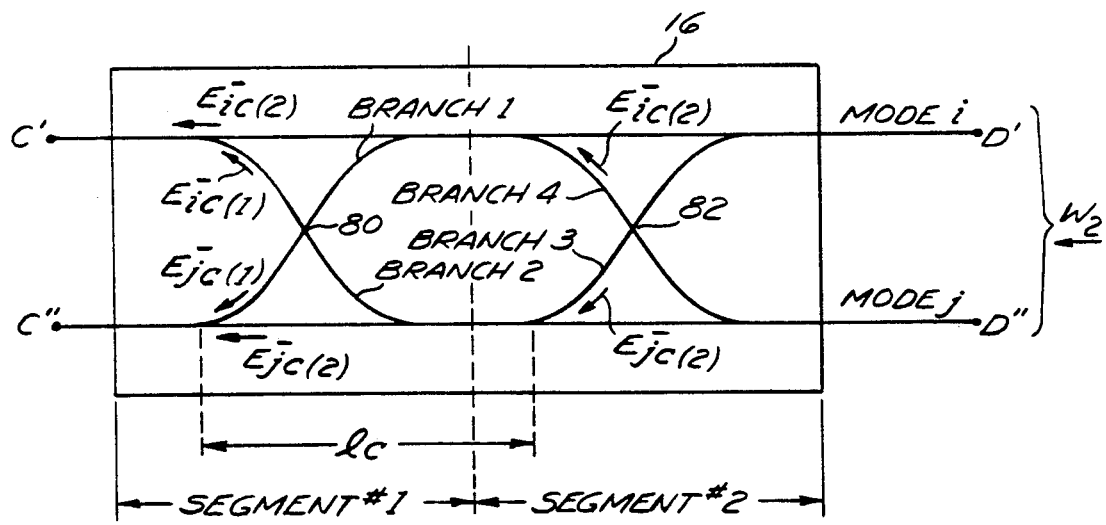

FIGS. 12 and 13 depict a conceptual model of the two segments of the fiber loop 16 of FIG. 11. For clarity of illustration, FIG. 12 shows only the clockwise wave $W_1$, while FIG. 13 shows only the counter-clockwise wave $W_2$. However, it will be understood that FIGS. 12 and 13 represent one and the same fiber, namely the fiber 16 of FIG. 11. The fiber models of FIGS. 12 and 13 are identical, in all respects, to the fiber model discussed in reference to FIGS. 2 and 3, except that the models of FIGS. 12 and 13 include two pairs of cross-coupling branches, which correspond to the two segments of the fiber loop 16 (FIG. 11). Branches 1 and 2 depict a scattering center 80 at the mid point of segment 1 of the loop 16 (FIG. 11). Similarly, branches 3 and 4 depict a scattering center 80 at the mid point of segment 2 of the loop 16 (FIG. 11). Since the segments 1,2 are each one fiber coherence length ($l_c$) in length, the scattering centers 80,82 are also separated by one fiber coherence length. Because the present discussion concerns only Group III components, only the cross-coupled components $E_{ic}$, $E_{jc}$, are shown in the drawings. The cross-coupled components in segment 1 of the fiber 16 are denoted by a subscript 1, while the cross-coupled components in segment 2 of the fiber 16 are denoted by a subscript 2. A plus (+) superscript is used to denote the clockwise direction of the wave W, while a minus (−) superscript is used to denote the counterclockwise direction of the wave $W_2$.

For the purposes of this discussion it will be assumed that both polarization modes i and j are launched with light having equal intensities, although it will be understood that this is not necessary for operation or use of the present invention. Referring to FIG. 12, the wave $W_1$ will include a cross-coupled component $E_{ic}{}^+{}_{(1)}$ which is coupled from mode j to mode i in branch 1, and a cross-coupled component $E_{jc}{}^+{}_{(1)}$ which is coupled from mode i to mode j in branch 2. In addition, the wave $W_1$ includes a cross-coupled component $E_{ic}{}^+{}_{(2)}$ which is coupled from mode j to mode i in branch 3, and a cross-coupled component $E_{jc}{}^+{}_{(2)}$ which is coupled from mode i to mode j in branch 4. Thus, when the wave $W_1$ reaches the end of the fiber 16, the components $E_{ic}{}^+{}_{(2)}$ and $E_{ic}{}^+{}_{(2)}$ will be in mode i, while the components $E_{jc}{}^+{}_{(1)}$ and $E_{jc}{}^+{}_{(2)}$ will be in the j mode. However, since the scattering centers 80,82 are separated from each other by one fiber coherence length, the segment 1 cross-coupled components will be incoherent with the segment 2 cross-coupled components, and thus, will not interfere. In other words, component $E_{ic}{}^+{}_{(1)}$ will be incoherent with component $E_{ic}{}^+{}_{(2)}$ and component $E_{jc}{}^+{}_{(1)}$ will be incoherent with component $E_{jc}{}^+{}_{(2)}$. Note also that there will be no interference between mode i light and mode j light, since the two modes are orthogonal.

The same analysis may be applied to the counter propagating wave $W_2$ as shown in FIG. 13. In segment 2, a component $E_{ic}{}^-{}_{(2)}$ is coupled from mode j to mode i in branch 4, while a component $E_{jc}{}^-{}_{(2)}$ is coupled from mode i to mode j in branch 3. In segment 1, the component $E_{ic}{}^-{}_{(1)}$ is coupled from mode j to mode i in branch 2, while a component $E_{jc}{}^-{}_{(1)}$ is coupled from mode i to mode j in branch 1. The segment 1 cross-coupled light in mode i, $E_{ic}{}^-{}_{(1)}$ will not interfere with the segment 2 cross-coupled light in mode i, $E_{ic}{}^-{}_{(1)}$ and the segment 2 cross-coupled light in mode j, $E_{jc}{}^-{}_{(2)}$ will not interfere with the segment 1 cross-coupled light in mode j, $E_{jc}{}^-{}_{(1)}$. Nor will there be any interference between mode i light and mode j light, since these modes are orthogonal.

When the counter propagating waves $W_1$, $W_2$ are recombined at the coupler 14 (FIG. 1), the only cross-coupled components of wave $W_1$ that will interfere with the cross-coupled components of the wave $W_2$ are those components which were coupled on symmetrical sides of the loop 16. That is, wave $W_1$ light which is cross coupled in segment 1 will interfere with wave $W_2$ light which is coupled in segment 2, and wave $W_1$ light which is coupled in segment 2, will interfere with wave $W_2$ light which is cross coupled in segment 1. Thus, for example, $E_{ic}{}^+{}_{(1)}$ will interfere with $E_{ic}{}^-{}_{(2)}$; $E_{ic}{}^+{}_{(2)}$ will interfere with $E_{ic}{}^-{}_{(1)}$, $E_{jc}{}^+{}_{(1)}$ will interfere with $E_{jc}{}^-{}_{(2)}$, and $E_{jc}{}^+{}_{(2)}$ will interfere with $E_{jc}{}^-{}_{(1)}$. Thus, upon recombination of the waves, $W_1$, $W_2$ at the coupler 14, the Group III resultant vector 60 (FIG. 7) will be comprised of four vectors, two representing i mode cross-coupled light, and two representing j mode cross-coupled light components.

Figure 14:
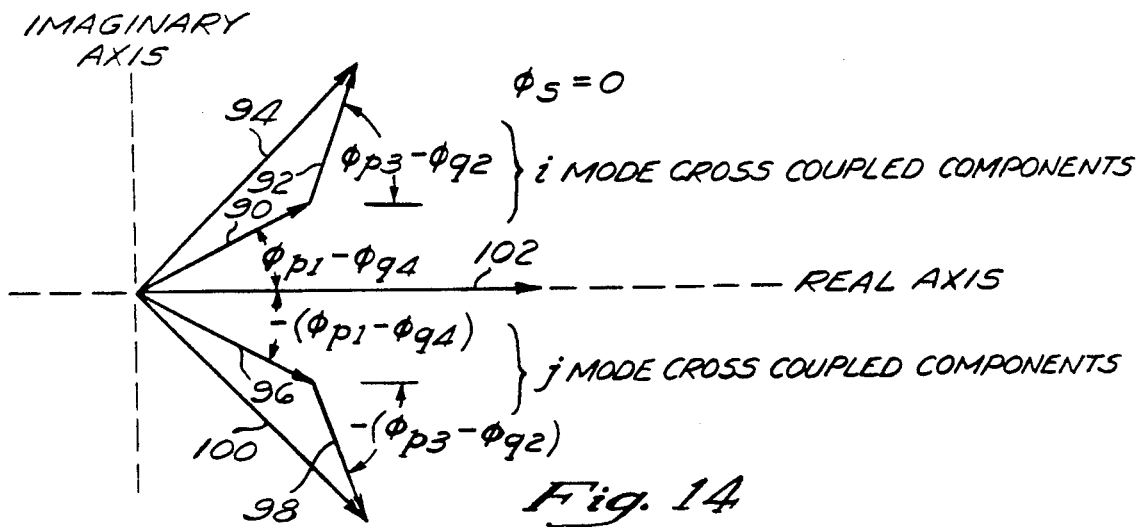
FIG. 14 is a vector diagram of the interference term resulting from Group III electric field components in the two segment fiber loop of FIGS. 11, 12, and 13, and illustrating that the vector in addition of such components yield resultant vectors which are reduced in magnitude.

The foregoing may be understood more fully through reference to FIG. 14 which shows a vector 90, representing interference between $E_{ic}{}^+{}_{(1)}$ and $E_{ic}{}^-{}_{(2)}$ and a vector 92, representing interference between component $E_{ic}{}^+{}_{(2)}$ and $E_{ic}{}^-{}_{(1)}$. These vectors 90,92 may be added to yield an i-mode resultant vector 94, representing the total intensity of i mode cross-coupled components. Note that the vector 90 has a phase angle of $(\phi_{p1}-\phi_{q4})$, while the vector 92 has a phase angle of $(\phi_{p3}-\phi_{q2})$, where the subscript p indicates the total accumulated phase for light that is cross coupled from one mode to the other between the terminals C'' and D'; the subscript q indicates total accumulated phase for light that is cross coupled from one mode to the other between terminals C' and D'' (FIGS. 12 and 13); and the subscripts 1, 2, 3 and 4 denote the branches 1, 2, 3 and 4 (FIGS. 12 and 13), respectively, traveled by the cross-coupled components. In general, the phase angles for the vectors 90,92 will be different, so that their vector addition yields a resultant 94 having a magnitude less than their algebraic sum.

Similarly, FIG. 14 shows a vector 96, representing interference between components $E_{jc}{}^+{}_{(1)}$ and $E_{jc}{}^-{}_{(2)}$, and a vector 98, representing interference between components $E_{jc}{}^+{}_{(2)}$ and $E_{jc}{}^-{}_{(1)}$, which vectorally add to provide a j-mode resultant vector 100, representing the total j mode cross-coupled components. The vectors 96 and 98 have phase angles which are equal and opposite to those of the vectors 90 and 92, respectively, so that the phase angles of the resultant vectors 94,100 are also equal and opposite. In accordance with the principles discussed in reference to FIGS. 6 through 9, to the extent that each of the modes are launched with light having an equal intensity, the j-mode vector 100 (j mode cross-coupled components) and the i-mode vector 94 (i mode cross-coupled components) will add vectorally to yield a Group III resultant vector 102, which lies along the real axis, as illustrated in FIG. 14.

Because the vectors 94,100 of FIG. 14 are each composed of two vectors having phase angles which, in general, are different, the magnitude of these vectors 94,100 will be less than they would had the loop 16 not been divided into plural fiber coherence length segments. Thus, the vectors 94,100 will be less in magnitude than their counterpart vectors 56,58 in FIGS. 6 and 8. Consequently, the magnitude of the resultant vector 102 will be less than its counterpart vector 60 in FIGS. 7 and 9.

Figure 15:
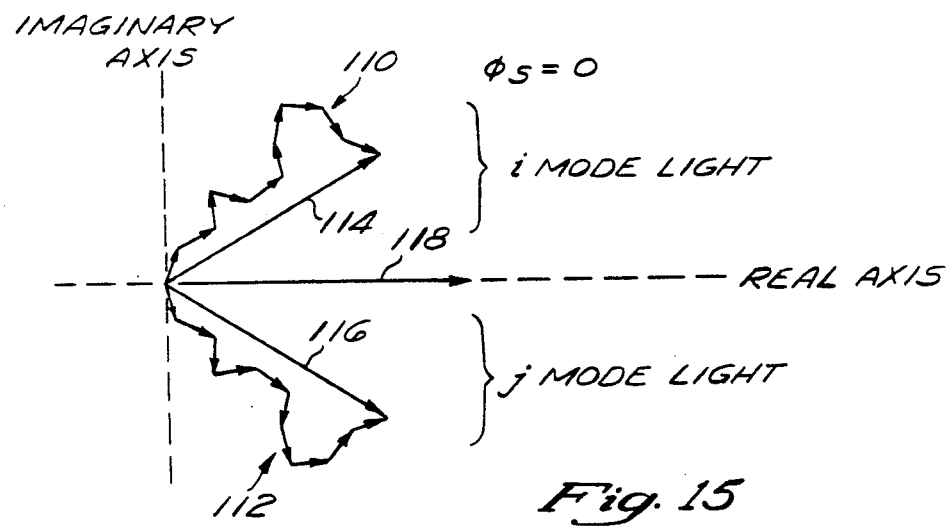
FIG. 15 is a vector diagram similar to that of FIG. 14, illustrating Group III interference components for a 10 segment loop vectorially adding to yield result invectors which are further reduced in magnitude.

The foregoing principles may be illustrated more dramatically through reference to FIG. 15, which depicts a vector diagram for a fiber loop comprised of 10 fiber coherence length segments, rather than the two segments depicted in the vector diagram of FIG. 14. In accordance with the present invention, the cross-coupled components on symmetrical segments of the loop will interfere with each other but not with components in other segments of the loop. Thus, assuming the segments are numbered sequentially from one end of the loop to the other, light cross coupled in segment 1 will interfere only with light cross coupled in segment 10; segment 2 light will interfere with segment 9 light, segment 3 light with segment 8 light, and so on. Consequently, there will be ten pairs of interfering components for i-mode light and ten pairs of interfering components for j-mode light, as represented by the ten vectors 110 and the 10 vectors 112 in FIG. 15. The phases of the individual vectors 110,112 are such that they add vectorially in a two-dimensional random walk to yield resultant vectors 114,116, respectively. Thus, there is a "statistical averaging" of the interference such that the magnitude of the resultant vectors 114,116 will be $1/\sqrt{N}$ that of the algebraic sum of the individual vectors 110,112, respectively. As the number of segments N in the loop is increased, the magnitudes of the vectors 112,114 will further decrease. The vectors 112,114 which have equal and opposite phase angles, add vectorially to yield a resultant vector 118. Again, the resultant vector 118 will be directed along the real axis only if the light intensity is equalized for the two modes so that the vectors 112,114 are equal.

Figure 16:
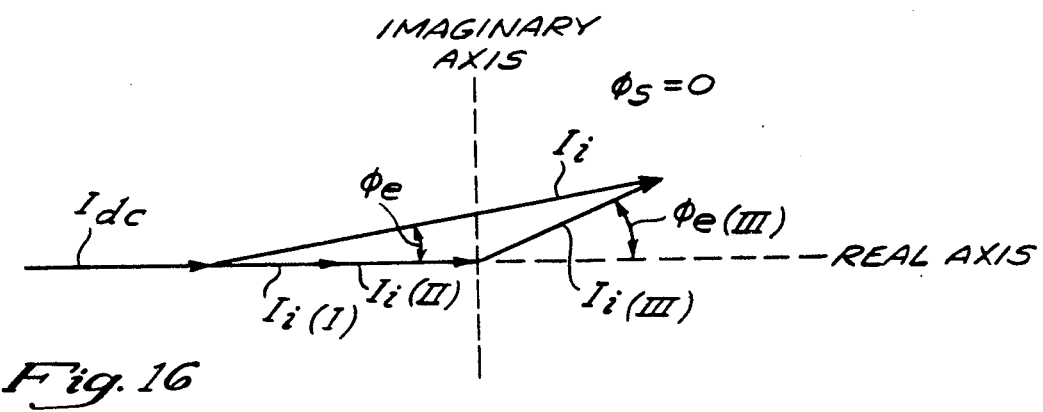
FIG. 16 is a vector diagram of the optical output signal at the detector, showing the interference vectors for Group I, Group II, and Group III components vectorially adding to form the overall interference vector, which represents the vector sum of all the interference terms, and further illustrating the effect of the magnitude and phase of Group III interference terms on the phase of the overall interference vector.

It will be recalled that, in practice, it is difficult to achieve precisely equal optical intensities, so that phase errors may be present. FIG. 16 shows, in general terms, the effect on the overall phase error ($\phi_e$) of Group III phase errors $\phi_{e(III)}$. As shown therein, the overall interference vector $I_i$ is the resultant of a Group I interference vector $I_{i(I)}$, a Group II interference vector $I_{i(II)}$, and a Group III interference vector $I_{i(III)}$. This Group III inteference vector Ii(III) corresponds, e.g., to the resultant vector 60 of FIGS. 7 or 9, or the resultant vectors 102,118 of FIGS. 14 and 15, respectively. It is assumed that phase errors due to the Group I and Group II components have been eliminated, so that the only phase error is that caused by Group III components. As the Group III phase error increases, the overall phase error $\phi_e$ correspondingly increases. For a given Group III phase error, however, the effect of such phase error on the overall phase error $\phi_e$ may be reduced by decreasing the magnitude of the Group III interference vector $I_{i(III)}$. The amount of phase error reduction is proportional to $1/\sqrt{N}$ where N is the number of fiber coherence length segments within the loop 16. The phase error approximation given by equation (10), therefore, may be further reduced by a factor of $1/\sqrt{N}$, so that:

$$\phi_e \approx \frac{2\alpha L \sin(\phi_p - \phi_q)[|E_j|^2 - |E_i|^2]}{\sqrt{N}\,[|E_j|^2 + |E_i|^2]} \quad (14)$$

It will be recalled that the maximum phase error $\phi_e(max)$ occurs when the quantity $(\phi_p - \phi_q)$ equals 90°, and when either $E_i$ or $E_j$ is zero. It follows that:

$$\phi_e(max) \approx \frac{2\alpha L}{\sqrt{N}} \quad (15)$$

Thus, by providing a plural number (N) of fiber coherence length segments within the loop 16 to reduce the magnitude of the Group III interference vector, as demonstrated above in reference to FIGS. 14 and 15, the overall phase error may be reduced by $1/\sqrt{N}$, thereby increasing rotation sensing accuracy.

Using present, state-of-the-art high birefringence fibers and short coherence length light sources, such as described above for the fiber 11 and source 10, a fiber coherence length on the order of 10 cm may be achieved. For a one kilometer loop length, this yields about 10,000 fiber coherence length segments. Substituting N=10,000 into equation (14), and assuming that $\alpha L$ is on the order of 0.01 radians, the maximum phase error will, therefore, be on the order of $10^{-4}$ radians. If the intensities for the polarization modes are equalized to within one percent, a further improvement, on the order of a factor of 100, may be realized, yielding a maximum phase error of $10^{-6}$ radians. Thus, by utilizing the high birefringence fiber in combination with the short coherence length source 10, and orienting the source polarization at 45 degrees relative to the principle axes of birefringence to equalize the intensities in the polarization modes, a simple, yet highly accurate, rotation sensor may be provided.

While the present invention has been described in the context of its use with unpolarized light, it will be understood that the invention is useful in other types of rotation sensors which do not utilize unpolarized light. For example, the above-referenced patent application entitled "Fiber Optic Rotation Sensor" utilizes a polarizer to achieve reciprocity, as opposed to utilizing unpolarized light. In the event a polarizer is used, such polarizer may be provided between the couplers 12,14 of FIG. 1, at the point labeled 130, so that both the input wave $W_i$ and the output wave $W_0$ pass through the polarizer as these waves propogate to and from the loop 16. The polarizer blocks light in one of the two orthogonal polarization modes, while passing light in the other, so that, theoretically, only light propagating through the loop in one of the polarization modes is detected. In practice, however, such polarizers are not perfect, and thus, do not block all of the cross-coupled light, so that phase errors may still be present. The present invention effectively reduces these phase errors in the same manner as described above, i.e. by providing plural coherence length segments within the loops so that light scattered from one mode to the other at an arbitrary point along the fiber loop will interfere only with that light which scatters to the same mode within one fiber coherence length of the symmetrical point on the other side of the loop. Thus, the present invention is broadly applicable to rotation sensing, and may be used in combination with other techniques to yield cumulative improvements in rotation sensing accuracy.

SCALE FACTOR IMPROVEMENT

Figure 17A:
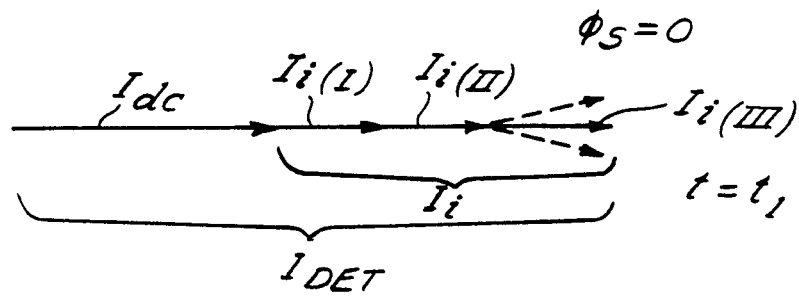
FIG. 17(a) and (b) are vector diagrams at times $t_1$ and $t_2$, respectively, illustrating how variations in the phases of Group III interference components for the two polarization modes can cause scale factor problems through variations in Group III vector magnitude.
Figure 17B:
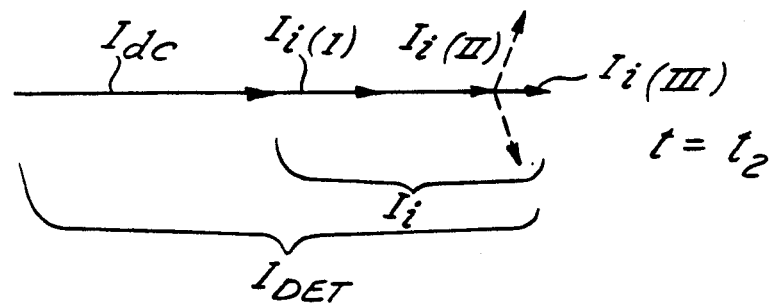

Those skilled in the art will understand that, although the i mode and j mode vectors in FIGS. 6, 8, 14 and 15 are necessarily drawn in a static position, their equal and opposite phase angles will vary in time between zero and 360°. Thus, even though the Group III resultant vectors (i.e., the resultant of the i and j mode vectors, such as the vector 60 of FIG. 9) remain along the real axis, they may undergo a substantial variation in magnitude. FIGS. 17(a) and (b) illustrate the effect of variations in the Group III resultant or interference vectors $I_{i(III)}$ upon the detected intensity of $I_{det}$ of the optical output signal $W_0$ (FIG. 1). The i and j mode vectors, which are illustrated by dotted lines in FIGS. 17(a) and (b), are shown as changing phase angles between time t=$t_1$ [FIG. 17(a)] t=$t_2$ [FIG. 17(b)]. At time $t_1$, their equal and opposite phase angles are small, resulting in a relatively large Group III inference vector $I_{i(III)}$. However, at time $t_2$, the phase angles have increased substantially, so that the Group III interference factor has been substantially reduced in magnitude, even though the magnitude of the i and j mode vectors remains unchanged. Since the detected optical intensity $I_{det}$ is the sum of the DC components, represented by the vector $I_{dc}$, plus all of the individual Group interference vectors, a variation in the Group III interference vector $I_{i(III)}$ will cause a variation in the detected optical intensity. While such variation does not present any phase error problems, it does result in a scale factor problem, in that the output intensity curve 52 can shrink or expand, as indicated previously in regard to FIG. 10. This scale factor problem is alleviated in the present invention by reducing the magnitude of the i and j mode vectors through statistical averaging as discussed in reference to FIG. 15. By reducing the i and j mode vector magnitudes, the range of variation in the resultant Group III interference vector $I_{i(III)}$ is necessarily reduced, so that the optical output signal $W_0$ is more stable. Thus, the present invention not only reduces phase errors, but also contributes to scale factor improvments.

THE COUPLERS 12 AND 14

Figure 18:
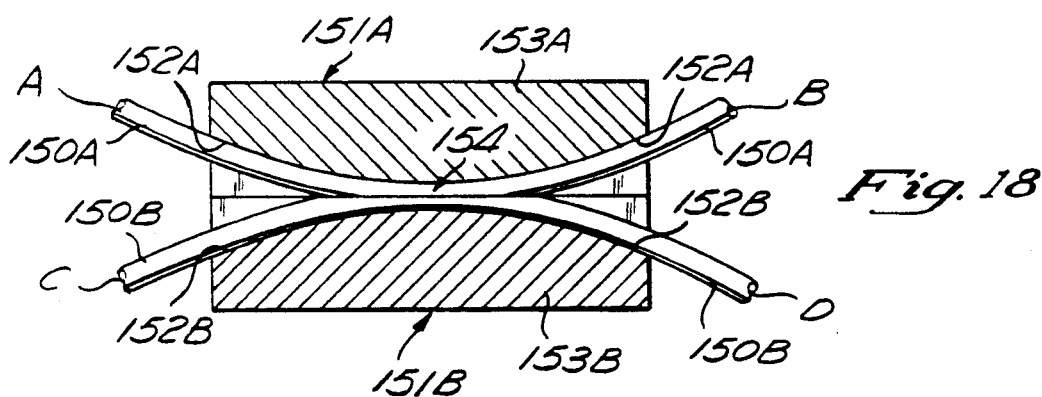
FIG. 18 is a sectional view of one embodiment of the fiber optical directional coupler for use in the rotation sensor of FIG. 1.

A preferred fiber optic directional coupler for use as the couplers 12 and 14 in the rotation sensor or gyroscope of the present invention is illustrated in FIG. 18. The coupler includes two exemplary strands 150A and 150B of a single mode fiber optic material mounted in longitudinal arcuate grooves 152A and 152B, respectively, formed in optically flat, confronting surfaces of rectangular bases or blocks 153A and 153B, respectively. The block 153A with the strand 150A mounted in the groove 152A will be referred to as the coupler half 151A, and the block 153B with the strand 150B mounted in the groove 152B will be referred to as the coupler half 151B.

The arcuate grooves 152A and 152B have a radius of curvature which is very large compared to the diameter of the fibers 150, and have a width slightly larger than the fiber diameter to permit the fibers 150, when mounted therein, to conform to a path defined by the bottom walls of the grooves 152. The depth of the grooves 152A and 152B varies from a minimum at the center of the blocks 153A and 153B, respectively, to a maximum at the edges of the blocks 153A and 153B, respectively. This advantageously permits the fiber optic strands 150A and 150B, when mounted in the grooves 152A and 152B, respectively, to gradually converge toward the center and diverge toward the edges of the blocks 153A,153B, thereby eliminating any sharp bends or abrupt changes in direction of the fibers 150 which may cause power loss through mode perturbation. In the embodiment shown, the grooves 152 are rectangular in cross-section, however, it will be understood that other suitable cross-sectional contours which will accommodate the fibers 150 may be used alternatively, such as a U-shaped cross-section or a V-shaped cross-section.

At the centers of the blocks 153, in the embodiment shown, the depth of the grooves 152 which mount the strands 150 is less than the diameter of the strands 150, while at the edges of the blocks 153, the depth of the grooves 152 is preferably at least as great as the diameter of the strands 150. Fiber optic material was removed from each of the strands 150A and 150B, e.g., by lapping to form respective oval-shaped planar surfaces, which are coplanar with the confronting surfaces of the blocks 153A,153B. These oval surfaces, where the fiber optic material has been removed, will be referred to herein as the fiber "facing surfaces". Thus, the amount of fiber optic material removed increases gradually from zero towards the edges of the blocks 153 to a maximum towards the center of the blocks 153. This tapered removal of the fiber optic material enables the fibers to converge and diverge gradually, which is advantageous for avoiding backward reflection and excess loss of light energy.

In the embodiment shown, the coupler halves 151A and 151B are identical, and are assembled by placing the confronting surfaces of the blocks 153A and 153B together, so that the facing surfaces of the strands 150A and 150B are in facing relationship.

An index matching substance (not shown), such as index matching oil, is provided between the confronting surfaces of the blocks 153. This substance has a refractive index approximately equal to the refractive index of the cladding, and also functions to prevent the optically flat surfaces from becoming permanently locked together. The oil is introduced between the blocks 153 by capillary action.

An interaction region 154 is formed at the junction of the strands 150, in which light is transferred between the strands by evanescent field coupling. It has been found that, to ensure proper evanescent field coupling, the amount of material removed from the fibers 150 must be carefully controlled so that the spacing between the core portions of the strands 150 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 150 is within the critical zone, each strand receives a significant portion of the evanescent field energy from the other strand, and good coupling is achieved without significant energy loss. The critical zone includes that area in which the evanescent fields of the fibers 150A and 150B overlap with sufficient strength to provide coupling, i.e., each core is within the evanescent field of the other. However, as previously indicated, mode perturbation occurs when the cores are brought too close together. For example, it is believed that, for weakly guided modes, such as the $HE_{11}$ mode in single mode fibers, such mode perturbation begins to occur when sufficient material is removed from the fibers 150 to expose their cores. Thus, the critical zone is defined as that area in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown, the required center-to-center spacing between the strands 150 at the center of the coupler is typically less than a few (e.g., 2-3) core diameters.

Preferably, the strands 150A and 150B (1) are identical to each other; (2) have the same radius of curvature at the interaction region 154; and (3) have an equal amount of fiber optic material removed therefrom to form their respective facing surfaces. Thus, the fibers 150 are symmetrical, through the interaction region 154, in the plane of their facing surfaces, so that their facing surfaces are coextensive if superimposed. This ensures that the two fibers 150A and 150B will have the same propagation characteristics at the interaction region 154, and thereby avoids coupling attenuation associated with dissimilar propagation characteristics.

The blocks or bases 153 may be fabricated of any suitable rigid material. In one presently preferred embodiment, the bases 153 comprise generally rectangular blocks of fused quartz glass approximately one inch long, one inch wide, and 0.4 inch thick. In this embodiment, the fiber optic strands 150 are secured in the slots 152 by an ultra-violet light sensitive cement.

The coupler includes four ports, labeled A, B, C, and D, in FIG. 18. When viewed from the perspective of FIG. 18, ports A and C, which correspond to strands 150A and 150B, respectively, are on the left-hand side of the coupler, while the ports B and D, which correspond to the strands 150A and 150B, respectively, are on the right-hand side of the coupler. For the purposes of discussion, it will be assumed that input light is applied to port A. This light passes through the coupler and is output at port B and/or port D, depending upon the amount of power that is coupled between the strands 150. In this regard, the term "normalized coupled power" is defined as the ratio of the coupled power to the total output power. In the above example, the normalized coupled power would be equal to the ratio of the power at port D of the sum of the power output at ports B and D. This ratio is also referred to as the "coupling efficiency", and when so used, is typically expressed as a percent. In this regard, tests have shown that the coupler of the type shown in FIG. 18 has a coupling efficiency of up to 100%. However, the coupler may be "tuned" to adjust the coupling efficiency to any desired value between zero and the maximum, by offsetting the facing surfaces of the blocks 153. Such tuning is preferably accomplished by sliding the blocks 153 laterally relative to each other.

The coupler is highly directional, with substantially all of the power applied at one side of the coupler being delivered to the other side of the coupler. That is, substantially all of the light applied to input port A is delivered to the output ports B and D, without contradirectional coupling to port C. Likewise, substantially all of the light applied to input port C is delivered to the output ports B and D. Further, this directivity is symmetrical. Thus, light supplied to either input port B or input port D is delivered to the output ports A and C. Moreover, the coupler is essentially non-discriminatory with respect to polarizations, and thus, preserves the polarization of the coupled light. Thus, for example, if a light beam having a vertical polarization is input to port A, the light coupled from port A to port D, as well as the light passing straight through from port A to port B, will remain vertically polarized.

From the foregoing, it can be seen that the coupler may function as a beam-splitter to divide the applied light into two counter-propagating waves $W_1, W_2$ (FIG. 1). Further, the coupler may additionally function to recombine the counter-propagating waves after they have traversed the loop 16 (FIG. 1).

In the embodiment shown, each of the couplers 12,14 has a coupling efficiency of 50%, as this choice of coupling efficiency provides maximum optical power at the photodetector 20 (FIG. 1).

When using the above-described coupler in the rotation sensor of FIG. 1, it is preferable to align the principal axes of birefringence so that the fast axis of the fiber 152A is parallel to the fast of the fiber 152B and the slow axis of the fiber 152A is parallel to the slow axis of the fiber 152B. Such alignment of the principal axes reduces the coupling between the fast and slow modes in the coupler, e.g. between the fast mode of one fiber and the slow mode of the other fiber, and between the slow mode of one fiber and the fast mode of the other fiber, insures that polarization is maintained as light passes through the coupler. This reduces phase errors by reducing mixing of the modes in the coupler.

For unpolarized light operation, the rotation sensor of FIG. 1 may be further simplified by eliminating the coupler 12 and relocating the detector 20 to receive light from the end of the fiber portion 17 at port B of the coupler 14. In this configuration, however, it is important that the coupler 14 be as lossless as possible, since coupler losses could result in a phase difference between the counter-propagating waves $W_1, W_2$ when the loop 16 is at rest, and thus, cause phase errors. Advantageously, the coupler described above has very low losses, on the orfer of 2% to 5%, and thus, is also preferred for this single-coupler configuration.

Additional details of the couplers 12,14 are described in U.S. Patent Application Ser. No. 300,955, filed Sep. 10, 1981, which is a continuation-in-part of U.S. patent application Ser. No. 139,511, filed Apr. 11, 1980, both of which are incorporated herein by reference. The coupler is also described in an article entitled "Single Mode Fiber Optic Directional Coupler", published in *Electronics Letters*, Vol. 16, No. 7 (Mar. 27, 1980, p. 260–261).

THE POLARIZER

Figure 19:
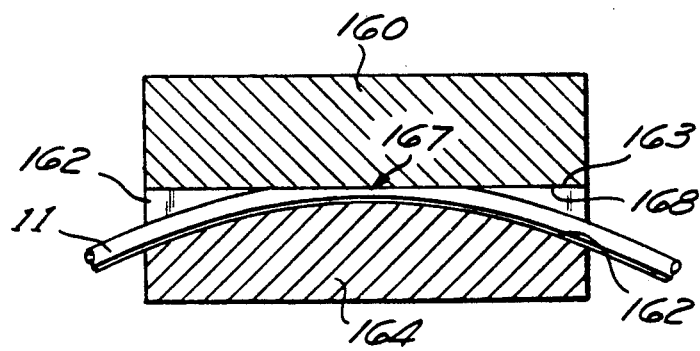
FIG. 19 is a sectional view of a fiber optic polarizer which may be utilized in the rotation sensor of FIG. 1.

A preferred polarizer for use in the rotation sensor of FIG. 1 at the point 130, is illustrated in FIG. 19. This polarizer includes a birefringent crystal 160, positioned within the evanescent field of light transmitted by the fiber 11. The fiber 11 is mounted in a slot 162 which opens to the upper face 163 of a generally rectangular quartz block 164. The slot 162 has an arcuately curved bottom wall, and the fiber is mounted in the slot 162 so that it follows the contour of this bottom wall. The upper surface 163 of the block 164 is lapped to remove a portion of the cladding from the fiber 11 in a region 167. The crystal 160 is mounted on the block 164, with the lower surface 168 of the crystal facing the upper surface 163 of the block 164, to position the crystal 160 within the evanescent field of the fiber 112.

The relative indices of refraction of the fiber 11 and the birefringent material 160 are selected to that the wave velocity of the desired polarization mode is greater in the birefringent crystal 160 than in the fiber 11, while the wave velocity of an undesired polarization mode is greater in the fiber 11 than the birefringent crystal 160. The light of the desired polarization mode remains guided by the core portion of the fiber 11, whereas light of the undesired polarization mode is coupled from the fiber 11 to the birefringent crystal 160. Thus, the polarizer 132 allows passage of light in one polarization mode, while preventing passage of light in the other orthogonal polarization mode. When a polarizer is used, the allowed polarization should be aligned with either the fast or the slow axes of the high birefringence fiber 11 for effective phase error reduction.

Further details of the polarizer are described in U.S. patent application, Ser. No. 195,934, filed Oct. 10, 1980, which is incorporated herein by reference. The polarizer is also described in an article entitled "Single Mode Fiber Optic Polarizer", published in *Optics Letters*, Vol. 5, No. 11 (November 1980), p. 479–481.

What is claimed:

1. An interferometer which provides an optical output signal, said interferometer comprising:
   an interferometer loop comprised of single mode birefringent waveguide which propagates light in first and second orthogonal polarization modes, the birefringence of said waveguide causing light in said first and second modes to propagate around said loop in first and second propagation times, respectively corresponding to first and second optical path lengths, respectively, said first optical path length being different from said second optical path length to provide an optical path length difference therebetween;

a light source providing light for input to said loop, said light having a coherence length which is at least about a hundred times less than the optical path length difference for said first and second modes to reduce phase errors caused by non-orthogonal components of said output signal;

an optical propagation path between said light source and said loop, said optical propagation path comprised of single mode birefringent waveguide which propagates light in two polarization modes, the birefringence of said waveguide causing light in said two orthogonal polarization modes to propagate from said source to said loop in third and fourth propagation times corresponding to third and fourth optical path lengths, respectively, said third and fourth optical path lengths having an optical path length difference therebetween which is equal to at least one coherence length of the source to reduce phase errors caused by non-orthogonal components of said output signal;

a polarizer in said optical propagation path between said source and said loop;

a first coupler for coupling light between said optical propagation path and said loop, said coupler comprised of two waveguides each having two axes of birefringence, one of said axes being a fast axis and the other being a slow axis, said axes being aligned to couple light from one fast axes to another fast axis and from one slow axis to another slow axes without substantial coupling between a fast axis and a slow axis, said coupler coupling light from said loop to said optical propagation path to form said optical output signal;

a detector; and a second coupler for coupling said optical output signal from said optical propagation path to said detector, said optical output signal propagating in two orthogonal polarization modes, said detector sized and positioned to intercept the optical output signal so as to detect light from both of the orthogonal polarization modes, such that light wave components in orthogonal modes of said optical output signal are spatially averaged so as to reduce phase errors resulting from orthogonal components of said signal.

2. The interferometer of claim 1, wherein said optical propagation path is comprised of a birefringent optical fiber.

3. The interferometer of claim 1, wherein said first coupler is comprised of juxtaposed optical fibers.

4. The interferometer of claim 1, wherein said second coupler is comprised of juxtaposed optical fibers.

5. The interferometer of claim 1, wherein the scattering rate from one polarization mode to the other in said interferometer loop is less than 1% per kilometer.

6. The interferometer of claim 1, wherein the coherence length is at least several hundred times less than the optical path length difference for the modes of said interferometer loop.

7. The interferometer of claim 1, wherein said orthogonal light wave components are spatially averaged under conditions of global orthogonality.

8. A method of reducing phase errors in an interferometer having an interferometer loop comprised of single mode birefringent waveguide which propagates light in two orthogonal polarization modes, said interferometer providing an output signal having both orthogonal and non-orthogonal light wave components, said method comprising:

utilizing a light source having a coherence length which is at least about a hunderd times less than the optical path length difference around said loop for said two modes to reduce phase errors caused by interference between non-orthogonal light wave components of said signal;

propagating light from said source through single mode birefringent waveguide disposed between the source and the loop such that, upon entering said loop, light in one polarization mode is substantially incoherent with respect to light in the other polarization mode to reduce phase errors caused by interference between non-orhtogonal light wave components of said signal;

polarizing the light propagating from the source to the loop; and spatially averaging orthogonal light wave components of said signal under conditions of global orthogonality to reduce phase errors resulting from orthogonal light wave components of said signal.

9. An interferometer which provides an optical output signal, said interferometer comprising:

an interferometer loop comprised of single mode birefringent waveguide which propagates light in first and second orthogonal polarization modes, the birefringence of said waveguide causing light in said first and second modes to propagate around said loop in first and second propagation times, respectively corresponding to first and second optical path lengths, respectively, said first optical path length being different from said second optical path length to provide an optical path length difference therebetween;

a light source providing light for input to said loop, said light having a coherence length which is at least about a hundred times less than the optical path length difference for said first and second modes to reduce phase errors caused by non-orthogonal components of said output signal;

an optical propagation path between said light source and said loop, said optical propagation path comprised of single mode birefringent waveguide which propagates light in two polarization modes, the birefringence of said waveguide causing light in said two orthogonal polarization modes to propagate from said source to said loop in third and fourth propagation times corresponding to third and fourth optical path lengths, respectively, said third and fourth optical path lengths having an optical path length difference therebetween which is equal to at least one coherence length of the source to reduce phase errors caused by non-orthogonal components of said output signal;

a polarizer in the optical propagation path between the source and the loop;

a coupler for coupling light between said optical propagation path and said loop, said coupler coupling light from said loop to said optical propagation path to form said optical output signal, said optical output signal propagating in said optical propagation path in two orthogonal polarization modes; and a detector sized and positioned to intercept the optical output signal so as to detect light from both of the orthogonal polarization modes, such that light wave components in orthogonal modes of said optical output signal are spatially averaged so as to reduce phase errors resulting from orthogonal components of said signal.

10. The interferometer of claim 9, wherein said optical propagation path is comprised of a birefringent optical fiber.

11. The interferometer of claim 9, wherein said coupler is comprised of juxtaposed optical fibers.

12. The interferometer of claim 9, additionally comprising a second coupler for coupling said optical output signal from said optical propagation path to said detector.

13. The interferometer of claim 9, wherein the scattering rate from one polarization mode to the other in said interferometer loop is less than 1% per kilometer.

14. The interferometer of claim 9, wherein the coherence length is at least several hundred times less than the optical path length difference for the modes of said interferometer loop.

15. The interferometer of claim 10, wherein said orthogonal light wave components are spatially averaged under conditions of global orthogonality.

* * * * *